United States Patent Office 3,574,689
Patented Apr. 13, 1971

3,574,689
6,1'-SPIROCYCLOPROPYL PROGESTERONES AND PROCESSES
Norman A. Nelson, Galesburg, Mich., assignor to The Upjohn Company, Kalamazoo, Mich.
No Drawing. Filed Mar. 24, 1965, Ser. No. 442,513
Int. Cl. C07c 169/34
U.S. Cl. 260—397.4
17 Claims

ABSTRACT OF THE DISCLOSURE

This disclosure relates to 6,1'-spirocyclopropylprogesterones, intermediates and processes for their production. The compounds are of value for their progestational and anti-inflammatory activity.

This invention relates to novel 6,1'-spirocyclopropylprogesterones and to processes for the production thereof. More particularly this invention relates to the novel compounds which are chemically represented by the following structural formulas, to novel intermediates and to processes for the production thereof:

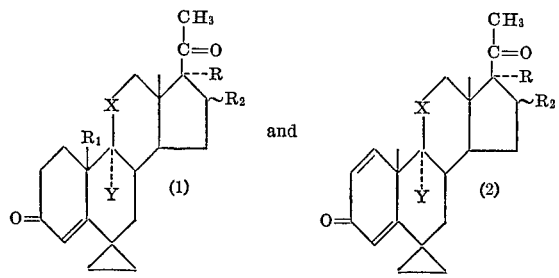

wherein R is hydrogen, hydroxy or OAcyl, in which Acyl is an acyl radical as hereinafter defined; $R_1$ is hydrogen or methyl; $R_2$ is hydrogen or methyl; X is $>CH_2$, $>C=O$ or

Y is hydrogen or fluorine; and wherein when X is $>CH_2$, Y is limited to hydrogen.

The novel compounds represented by above structures (1) and (2) have progestational and anti-inflammatory activity. The progestational agents are useful in the maintenance of pregnancy and in the regulation of ovulation. The anti-inflammatory agents are useful in the treatment of arthritis and related diseases; various inflammatory conditions of the skin, respiratory tract, bones and internal organs; contact dermatitis and allergic reactions.

The novel compounds of this invention are useful in the treatment of animals, including mammals, and birds, and are particularly useful in the treatment of humans and valuable domestic animals. They can be administered in conventional dosage forms, such as pills, tablets, capsules, syrups, or elixers for oral use, or in liquid forms which are suitable for injectable products. They can also be administered topically in the form of ointments, creams, lotions, and the like, with or without coacting antibiotics, germicides or other materials forming advantageous combinations therewith.

In the process of this invention a spirocyclopropyl group is introduced into a steroid of the progesterone series by one of two alternative routes designated as Route A and Route B. Route A is generally preferred in the practice of this invention.

ROUTE A

Route A of this invention and the compounds produced thereby are represented by the following reaction scheme:

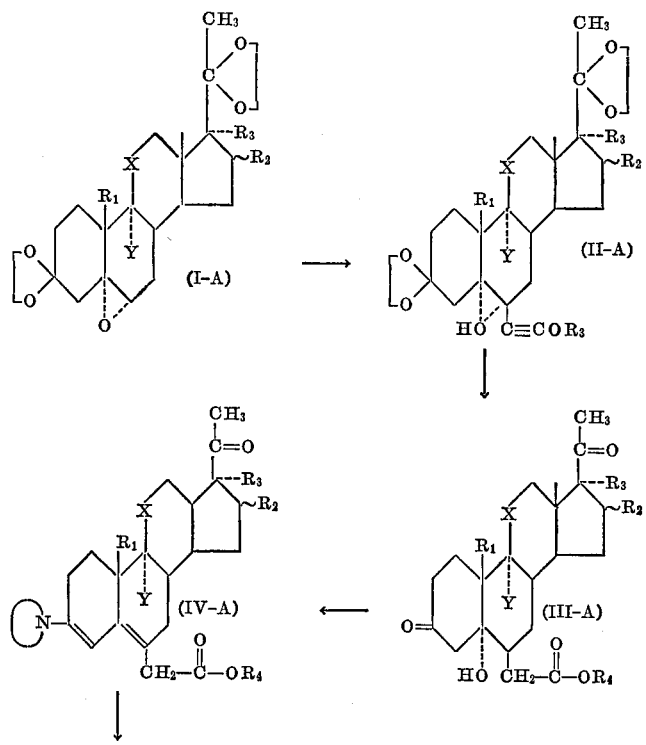

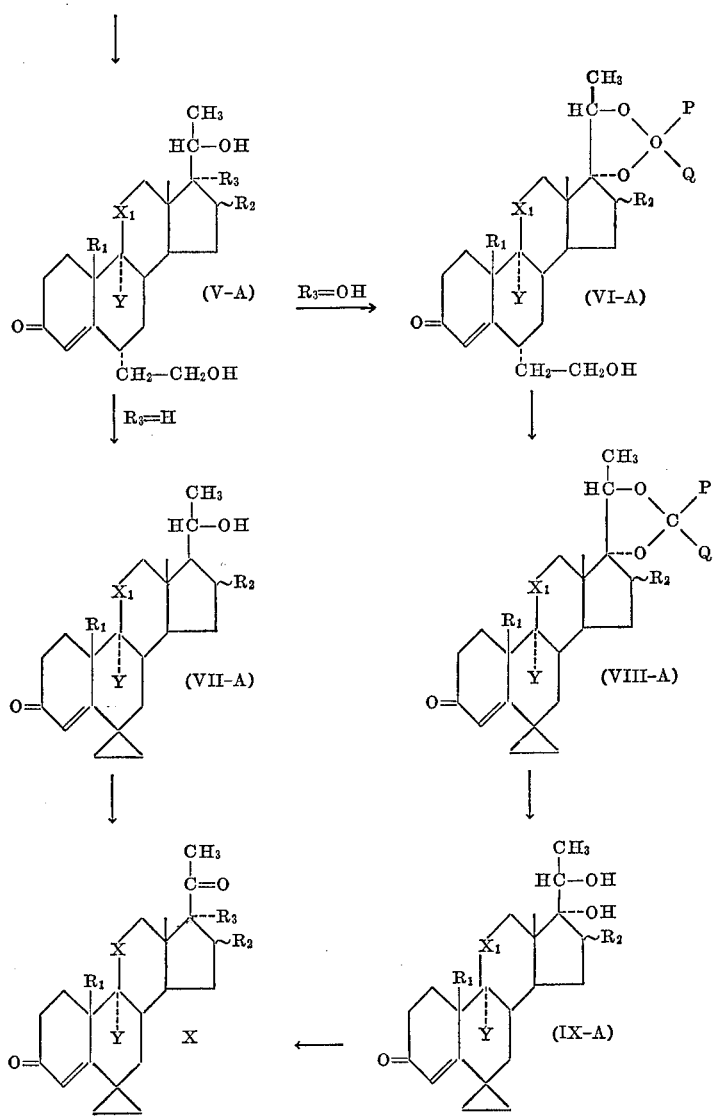

wherein $R_1$, $R_2$, X and Y have the same meanings as previously given; P and Q are selected from the group consisting of hydrogen, alkyl, aralkyl, and aryl, and P and Q taken together with the attached carbon atom can also represent cycloalkyl; $X_1$ is

or $>CH_2$; $R_3$ is hydrogen or hydroxy; $R_4$ is alkyl; the symbol

represents an alkylenedioxy radical of the formula

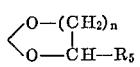

wherein $n$ is the integer 1 or 2 and $R_5$ is hydrogen or alkyl; the symbol

is a cyclic amino radical; and wherein when X or $X_1$ is $>CH_2$, Y is limited to hydrogen.

In this application the wavy line appearing at the 16-position represents the α (alpha) configuration, the β (beta) configuration or mixtures thereof. The term "Acyl" means the acyl radical of an organic carboxylic acid preferably a hydrocarbon carboxylic acid, of 1 to 16 carbon atoms, inclusive. The term "alkyl" means an alkyl radical of 1 to 8 carbon atoms, inclusive, such as methyl, ethyl, propyl, butyl, amyl, hexyl, heptyl, octyl, and isomeric forms thereof. The term "cycloalkyl" means a cycloalkyl radical of 3 to 8 carbon atoms, inclusive, such as cyclopropyl, cyclobutyl, cyclopentyl, cyclohexyl, cycloheptyl, and cyclooctyl. The term "aralkyl" means an aralkyl radical of 7 to 13 carbon atoms, inclusive, such as benzyl, phenethyl, phenylpropyl, benzhydryl, and the like. The term "aryl" means an aryl radical of 6 to 12 carbon atoms, inclusive, such as phenyl, tolyl, xylyl, naphthyl, diphenyl, halophenyl, nitrophenyl, and the like. The term "cyclic amino radical" means a saturated 5 to 9 ring atom cyclic amino radical and is inclusive of pyrrolidino, alkylpyrrolidino, such as 2-methylpyrrolidino, 2,2-dimethylpyrrolidino, and the like, piperidino, alkylpiperidino such as 2-methylpiperidino, 3-methylpiperidino, 4,4-dimethylpiperidino and the like, 4-methylpiperazino and the like, morpholino, alkylmorpholino, such as 2-methylmorpholino, 3-methylmorpholino and the like, hexamethyleneimino, homomorpholino, homopiperidino, thiomorpholino, octamethyleneimino, and the like.

The 5α,6α-epoxides of Formula I-A employed as starting materials in the process of this invention are for the greater part known or can be prepared by known methods such as those set forth below and in the preparations appended hereto. Thus the starting materials of Formula I-A can be prepared by diketalizing a compound of the formula:

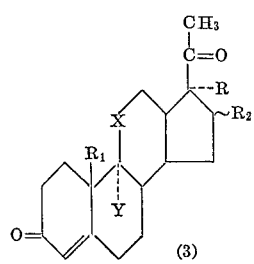

wherein R, $R_1$, $R_2$, X and Y have the same meaning as previously given, at the 3- and 20-positions with ketalizing agents in accordance with methods known in the art to produce the corresponding $\Delta^5$-3,20-bis(alkylenedioxy) compounds. The ketalization reaction is carried out by reacting the said 3,20-diketone with an alkane-1,2-diol or alkane-1,3-diol such as ethylene, propylene, trimethylene, 1,2-butylene, 2,4-pentylene, 4-methyl-1,2-pentylene, 6-methyl-1,3-hexylene, 1,2-heptylene, 3,4-heptylene, 1,2-octylene glycol, and the like; preferably in an organic solvent such as benzene, toluene, xylene, methylene chloride, and the like, and in the presence of an acid catalyst such as p-toluenesulfonic acid, benzenesulfonic acid and the like. The reaction is conducted at a temperature between about 20° C. and about 200° C., preferably between about 70° C. and about 120° C. The time required for the reaction is not critical and may be varied between about 1 and 48 hours, depending on the temperature, the ketalizing agent and catalyst employed.

The $\Delta^5$-3,20-bis(alkylenedioxy) compounds thus obtained are then epoxidized at the 5,6-positions with a per-acid such as perbenzoic, peracetic or perphthalic in accordance with methods known in the art [Campbell et al., J. Am. Chem Soc., 80, 4717 (1958)] to produce the corresponding 5α,6α-epoxides of Formula I–A. The 5β,6β-epoxides are also concomitantly obtained. The reaction is conducted in an inert organic solvent such as tetrahydrofuran, chloroform, methylene chloride, benzene, ether, diglyme, and the like at temperatures from 0 to 100° C. for from about 1 to 80 hours. When the reaction is complete the excess per-acid is decomposed and the desired 5,6-epoxides are separated or recovered by conventional methods such as chromatography and/or crystallization.

In carrying out the process of Route A of this invention a 5α,6α-epoxy-3,20-bis(alkylenedioxy) steroid of Formula I–A is reacted with an alkoxyacetylene magnesium halide, preferably an alkoxyacetylene magnesium halide in which the alkyl substituent preferably contains from 1 to 4 carbon atoms, inclusive, and more particularly ethoxyacetylene magnesium bromide in accordance with the procedures disclosed in U.S. Pat. 3,088,946 to produce the corresponding 6β-alkoxyethynyl-5α-hydroxy compounds of Formula II–A.

The selected 6β-alkoxyethynyl-5α-hydroxy compound is then subjected to hydrolysis in the presence of a strong acid such as sulfuric, hydrochloric, hydrobromic, perchloric, p-toluenesulfonic, oxalic, acetic and the like in the presence of an inert organic solvent, advantageously a solvent miscible with water such as tetrahydrofuran, acetone, a lower-alkanol, 1,2-dimethoxyethane, dioxane, dimethylformamide and the like. The hydrolysis can be carried out within a relatively wide temperature range such as from 0 to 50° C. or higher, however, the hydrolysis is advantageously conducted at room temperature, i.e., of the order of 25° C. or at moderately elevated temperatures. The time required for completion of the reaction varies with the temperature employed, a period of from about 3 to 8 hours is generally sufficient at the preferred temperature range. There is thus produced the corresponding 3-oxo-6β-acetic acid alkyl ester of Formula III–A. The 3-oxo-6β-acetic acid alkyl ester is then reacted with a secondary cyclic amine, pyrrolidine is preferred, in accordance with methods known in the art, e.g., U.S. Pat. 3,070,612, to produce the corresponding 3-enamine (IV–A), which is then treated with a reducing agent to produce the corresponding 6-(2'-hydroxyethyl)-3-enamine, (when an 11-oxo group is present at the 11-position it is concomitantly reduced to an 11β-hydroxy group) which gives on hydrolysis with an aqueous acid or a base the corresponding 6α-(2'-hydroxyethyl)-pregn-4-ene-3-one of Formula V–A. Suitable reducing agents are lithium aluminum hydride, sodium borohydride, potassium borohydride, diborane, diisobutyl aluminum hydride, and the like, in an inert organic solvent such as ether, diglyme, tetrahydrofuran, and the like. The preferred reducing agent is lithium aluminum hydride in tetrahydrofuran. The reaction is preferably conducted at reflux temperature and a period of 1 to 4 hours is generally sufficient for completion of the reaction.

The compounds of Formula V–A wherein $R_3$ is hydroxy are then converted to the corresponding 17,20-acetals of Formula VI–A by reacting the selected 17α-hydroxy compound of Formula V–A with the appropriate aldehyde or ketone having the formula

wherein P and Q are as hereinbefore defined. The reaction is preferably conducted in the presence of an acid catalyst such as perchloric acid, p-toluenesulfonic acid, hydrochloric acid, and the like. Where the aldehyde or ketone is a liquid, it is convenient to employ an excess of same to serve as solvent for the reaction. Where the aldehyde or ketone is a solid, it is desirable to employ an inert organic solvent, such as tetrahydrofuran, dioxane, ether and the like, to facilitate the reaction.

The 6α-(2'-hydroxyethyl) compounds of Formulae V–A and VI–A are then converted to the 6,1'-spirocyclopropanes of Formulae VIII–A and VIII–A, respectively, by treating the selected compound with an organic sulfonic acid halide, preferably a hydrocarbon sulfonic acid halide of 1 to 12 carbon atoms, inclusive. The reaction is generally carried out in the presence of pyridine with or without co-solvents, such as methylene chloride, tetrahydrofuran, benzene, toluene, and the like, in accordance with the procedure disclosed in U.S. Pat. 3,105,083, to produce the corresponding 6α-(2'-organic sulfonyloxyethyl) derivative. Illustrative of organic sulfonic acid halides of saturated aliphatic sulfonic acids, such as methanesulfonic, ethanesulfonic, propanesulfonic, butanesulfonic, pentanesulfonic, hexanesulfonic, nonanesulfonic, dodecanesulfonic, 2-propanesulfonic, 2-butanesulfonic, 2-pentanesulfonic, 2-octanesulfonic, tertiarybutanesulfonic; saturated cycloaliphatic sulfonic acids such as cyclopentanesulfonic and cyclohexanesulfonic; aralkyl sulfonic acids such as phenylmethanesulfonic and phenylethanesulfonic; and aryl sulfonic acids such as benzenesulfonic, o-toluenesulfonic, p-toluenesulfonic, o-bromobenzenesulfonic, p-bromobenzenesulfonic, o-chlorobenzenesulfonic, p-chlorobenzenesulfonic, o-, m-, p-nitrobenzenesulfonic, anisole-2-sulfonic, anisole-4-sulfonic, and the like. The 6α-(2'-organic sulfonyloxyethyl) derivatives of the compounds (V–A) and (VI–A) thus obtained can be separated from the reaction medium by conventional methods as hereinbefore disclosed and used directly in the next step or it can be further purified by chromatography or crystallization.

The 6α-(2'-organic sulfonyloxyethyl) compounds are then subjected to a displacement reaction under basic conditions to effect ring closure at the 6-position. Ring closure is effected under a wide range of conditions and with a wide variety of bases. Illustrative of bases which can be used are alkali metal alkoxides such as potassium tert.-butoxide, sodium methoxide, lithium ethoxide, and the like, sodium or potassium hydroxide in alcohols or aqueous alcohols, secondary amines in alcohols such as pyrrolidine in methanol, alkali earth hydroxides such as barium or calcium hydroxide, and the like. The reaction is advantageously conducted in an organic solvent such as alcohol, e.g., methanol, ethanol, propanol, isopropanol, butanol and tert.-butanol; tetrahydrofuran, dioxane or other suitable solvent, when an alkali metal alkoxide is used the reaction is preferably conducted using the corresponding alcohol. There is thereby obtained the respective 6,1'-spirocyclopropanes of Formulae VIII–A and VIII–A.

Substituents other than organic sulfonyloxy such as chlorine, bromine, iodine, quaternary ammonium ions and the like can be used effectively in the displacement reaction. The substituents can be introduced into the 6-(2'-hydroxyethyl) side chain in accordance with known methods.

The compounds of Formula VIII–A thus obtained are then subjected to hydrolysis to remove the acetonide group to give the corresponding 17α,20-hydroxy compounds of Formula IX–A. The hydrolysis is carried out using an aqueous mineral acid, for example hydrochloric, sulfuric, perchloric, hydrobromic and the like, preferably in the presence of a water miscible organic solvent such as ethylene glycol, ethanol, methanol and other lower alkanols, tetrahydrofuran, dimethylformamide, dioxane, and the like, or the hydrolysis can be accomplished using an aqueous organic acid such as formic, acetic, propionic, oxalic, p-toluenesulfonic and the like.

The 6,1'-spirocyclopropane-20-hydroxy compounds of Formulae VII–A and IX–A are then oxidized in accordance with methods well known in the art for oxidizing secondary hydroxy groups in steroids. For example the compounds of Formula VII–A and IX–A wherein $X_1$ is $>CH_2$ are dissolved in an inert organic solvent, such as, acetone, benzene, methylene chloride, tert.-butanol and the like and oxidized with a theoretical amount or more of an oxidizing agent such as aqueous chromic acid (an excess of about 15% is preferred) to give the corresponding 20-oxo compounds of Formula X, wherein X is $>CH_2$.

The compounds of Formulae VII–A and IX–A, wherein $X_1$ is

can likewise be oxidized at the 11- and 20-positions in the same manner using a theoretical amount or more of an oxidizing agent such as aqueous chromic acid to give the corresponding compounds of Formula X, wherein X is $>C=O$.

Oxidation of the 20-hydroxy group in the above pregnanes results in some side chain degradation concomitantly producing the corresponding androstanes. When an 11β-hydroxy group is present it is likewise oxidized to an 11-oxo group. Side chain degradation can be prevented or kept at a minimum by carrying out the chromic acid oxidation in the presence of manganous or cerous ions as disclosed in U.S. Pat. 3,057,884.

The compounds of Formulas VII–A and IX–A, wherein X is

can be selectively oxidized at the 20-position to obtain the corresponding compounds of Formula X, wherein X is by dissolving the selected steroid in an inert organic solvent, such as those listed above, and oxidizing with the theoretical amount of oxidizing agent necessary to oxidize only the 20-hydroxy group, for example using aqueous chromic acid.

ROUTE B

Route B of this invention and the compounds produced thereby are illustratively represented by the following reaction scheme:

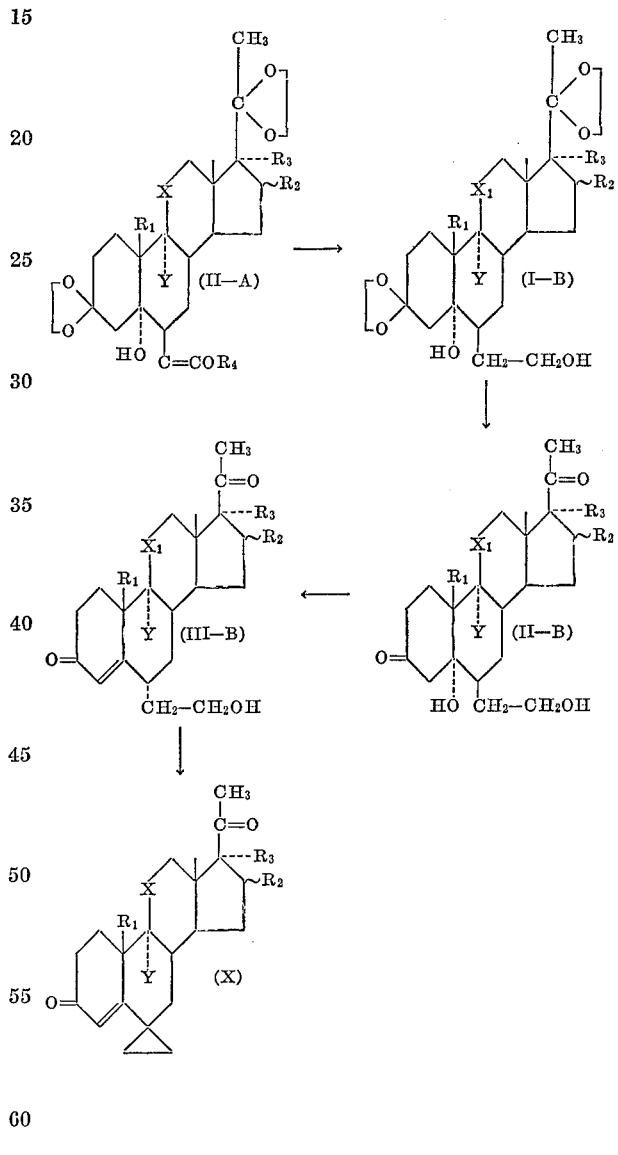

wherein $R_1$, $R_2$, $R_3$, X, $X_1$, Y and the symbol

have the same meanings as previously given.

In carrying out the process of Route B of this invention a 6β-ethynyl-5α-hydroxy compound of Formula II–A prepared in accordance with the procedure disclosed in Route 4, above, is treated with an organic carboxylic acid, preferably a liquid hydrocarbon carboxylic acid containing from 1 to 6 carbon atoms, inclusive, such as formic, acetic, propionic, butyric, isobutyric, and the like. Glacial acetic acid is particularly advantageous. The reaction can be carried out in the presence of an organic solvent, such as ether, methylene chloride, benzene, toluene and the like, or the acid can act as the solvent for the steroid. The reaction is carried out at temperatures from 0 to 80° C., with a temperature of about 25° C. being preferred. The time required for completion of the reaction is from about 1 to 48 hours, depending on the acid and temperature employed. The product thus obtained is separated from the reaction medium by conventional methods, for example, by diluting the reaction mixture with an excess of cold aqueous base, e.g., sodium or potassium hydroxide, and extracting the product with a water immiscible organic solvent such as ethyl acetate, methylene chloride, toluene, benzene, Skellysolve B hexanes (hereinafter referred to as Skellysolve B) and the like. The extract thus obtained is then washed and dried and the solvent removed by evaporation or distillation. The product thus obtained is then treated with a reducing agent, lithium aluminum hydride is preferred, in the same manner as disclosed in Route A, above, for the conversion of the compounds of Formula IV–A to the compounds of Formula V–A. There are thus obtained the corresponding 6β - (2'-hydroxyethyl)-5α-hydroxy-3,20-bis (alkylenedioxy) compounds of Formula I–B. Likewise as in Route A when the 11-oxo group is present it will be reduced to an 11β-hydroxy group.

The compounds of Formula I–B are then subjected to acid hydrolysis in accordance with known methods, for example, under mildly acidic conditions at moderate temperatures to remove the alkylenedioxy groups, giving the corresponding 3,20-dioxo compounds of Formula II–B.

The compounds of Formula II–B are then subjected to dehydration with a base to produce the corresponding 6α-(2'-hydroxyethyl)-pregn-4-en-3,20-diones of Formula III–B. Bases which can be used include sodium or potassium hydroxide, alkali metal alkoxides, e.g., sodium methoxide or ethoxide, alkali earth hydroxides such as barium hydroxide or calcium hydroxide, and the like, in the presence of an inert organic solvent such as methanol, ethanol, dioxane, or other suitable solvents. The alkaline reaction mixture can be allowed to react slowly at room temperature over a period of from 1 to 48 hours or the mixture can be brought to reflux temperature and refluxed until the reaction is complete, 1 to 30 minutes is usually sufficient. This reaction is preferably conducted using methanol as the solvent and sodium hydroxide as the base. Under these conditions a reflux period of from 2 to 10 minutes is usually sufficient for dehydration.

The compounds of III–B are then subjected to a displacement reaction under conditions to effect ring closure in the same manner as disclosed in Route A above, to give the corresponding 6,1'-spirocyclopropanes of Formula X. Likewise as in Route A substituents other than organic sulfonyloxy such as those previously named, can be used effectively in the displacement reaction.

The compounds of Formula X wherein X is

can be oxidized to the corresponding compounds of Formula X wherein X is >C=O in accordance with methods well known in the art for oxidizing 11-hydroxy groups in steroids, for example using chromic acid.

The 6,1'-spirocyclopropyl compounds of Formula X, prepared by Route A or B, above, are converted to other compounds of this invention in accordance with the following reaction scheme:

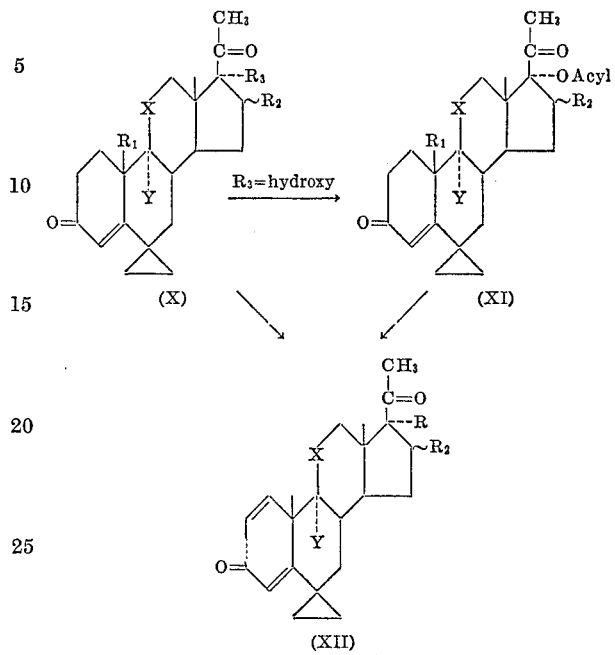

wherein Acyl, R, $R_1$, $R_2$, $R_3$, X and Y have the meanings and limitations previously given.

Thus the compounds of Formula X can be acylated to give the corresponding compounds of Formula XI in accordance with methods known in the art for acylating 17α-hydroxy groups in steroids, for example, by reaction with the anhydride of the selected acid. Thus the esterification can readily be accomplished by heating the starting steroid (X) with the selected anhydride in the presence of an alkali earth carbonate such as calcium carbonate. Short heating will not appreciably affect the 3-keto group of a starting steroid. When esterifying a Δ$^4$-steroid or upon prolonged heating of a Δ$^{1,4}$-steroid, the 3-keto group may be concomitantly converted to an enol ester group. If this occurs the enol is readily reconverted to a 3-keto group by mild treatment with base, e.g., heating with dilute aqueous sodium or potassium bicarbonate, while at the same time leaving the 17-acylate group unaffected.

Acylating agents which can be employed in the preparation of the above acylates are the anhydrides of organic carboxylic acids, particularly hydrocarbon carboxylic acids containing from 1 to 16 carbon atoms, inclusive. Illustrative are anhydrides of hydrocarbon carboxylic acids which include saturated and unsaturated aliphatic acids and aromatic acids such as acetic, propionic, butyric, isobutyric, valeric, isovaleric, caproic, caprylic, decanoic, dodecanoic, palmitic, arcylic, crotonic, hexynoic, heptynoic, octynoic, cylobutanecarboxylic, cyclopentanecarboxylic, cyclopentenecarboxylic, cyclohexane carboxylic, dimethylcyclohexanecarboxylic, benzoic, toluic, naphthoic, ethylbenzoic, phenylacetic, naphthaleneacetic, phenylvaleric, cinnamic, phenylpropiolic, phenylpropionic, p-butoxyphenylpropionic, succinic, glutaric, dimethylglutaric maleic, cyclopentylpropionic, and the like.

The compounds of Formulae X and XI wherein $R_1$ is methyl, are dehydrogenated at the 1,2-position by fermentative or chemical dehydrogenation to give the corresponding compounds of Formula XII. Fermentative dehydrogenation comprises the use of microorganisms such as Septomyxa, Corynebacterium, Fusarium, and the like, under fermentation conditions well known in the art (e.g., U.S. 2,602,769; 2,902,410 and 2,902,411). Where Septomyxa is used to effect the dehydrogenation it is found to be advantageous to use with the substrate and medium a steroid promoter. When a 17α-oxygen containing group is present in the starting material, the free alcohols (X) are usually employed for the fermentative dehydrogenation process. However, the corresponding 17-acylates (XI) can be used, in these cases the 17-ester group is generally hydrolyzed during the fermentation process giving the corresponding free alcohol (XII). The alcohols can be acylated in the same manner as previously disclosed for acylating the corresponding $\Delta^4$-compounds. Chemical dehydrogenation can be carried out with selenium dioxide according to known procedures, see, for example, Meystre et al., Helv. Chim. Acta, 39, 734 (1956) or with 2,3-dichloro-5,6-dicyano-1,4-benzoquinone in a suitable organic solvent such as dioxane or benzene, see, for example, Djerassi, Steroid Reactions, Holden-Day Inc., San Francisco (1963) p. 232. When a 17α-oxygen containing substituent is present, the 17-acylates (XI) are generally preferred as starting materials in the selenium dioxide dehydrogenation reaction giving the corresponding $\Delta^{1,4}$-17-acylates of Formula XII. The 17-acylates thus obtained can be saponified, if desired, by methods known in the art to give the corresponding 17-free alcohols.

The $\Delta^4$-androstenes disclosed herein can likewise be dehydrogenated at the 1,2-position in accordance with the fermentative and chemical dehydrogenation procedures disclosed above to obtain the corresponding $\Delta^{1,4}$-androstenes.

All of the compounds embraced by Formulae I-A through X, I-B through X, and X through XII can be isolated from their reaction mixtures by conventional means. For example, when a water-miscible solvent is used, by pouring the reaction mixture into water, and separating the resulting precipitate by filtration, when a water-immiscible solvent is used the reaction mixture can be diluted with water and the product can be recovered in the solvent. The water layer can be further extracted with additional solvent, either the same solvent or another suitable solvent. Solvents which can be used include, for example, methylene chloride, ethyl acetate, chloroform, Skellysolve B, benzene, toluene, xylene, ethers, mixtures thereof, e.g., Skellysolve B-methylene chloride, and the like. When water is used as the reaction medium such as in the bioconversion process, the product can be extracted with a water-immiscible solvent such as those listed above.

Additional purification of the products can be accomplished by conventional methods, for example, by elution chromatography from an adsorbent column with a suitable solvent such as acetone, methanol, dilute methanol, ethanol, ether, methylene chloride and Skellysolve B, mixtures and combinations of these solvents; also by gradient elution chromatography from an adsorbent column with a suitable mixture of solvents, such as methylene chloride-Skellysolve B, acetone-Skellysolve B, and the like. Skellysolve B is essentially a mixture of hexanes.

The following preparation and examples illustrate the best mode contemplated by the inventor for carrying out his invention, but are not to be construed as limiting the scope thereof.

PREPARATION 1

*5α,6α-epoxy-3,20-bis(ethylenedioxy)-pregnan-17α-ol*

A mixture of 100 g. of 17α-hydroxypregn-4-ene-3,20-dione, 2000 ml. of benzene, 600 ml. of ethylene glycol and 4 g. of p-toluenesulfonic acid was stirred and refluxed under a water trap for about 18 hours. An additional 2 g. of p-toluene-sulfonic acid was added and the mixture was refluxed for an additional period of about 6 hours. The mixture was then cooled, 6 m. of pyridine was added and the mixture was washed with aqueous sodium bicarbonate solution, water, dried, and concentrated below 50° C. in vacuo. The residue thus obtained was crystallized from ethyl acetate to give 61 g. of 3,20-bis(ethylene dioxy)-pregn-5-en-17α-ol, M.P. 204–206° C.

The product thus obtained was dissolved in chloroform and treated with 116 ml. of 40% peracetic acid and 15 g. of sodium acetate trihydrate to give 29.0 g. of 5α,6α-epoxy-3,20-bis(ethylenedioxy)-pregnan-17α-ol, M.P. 210–214° C.

In the same manner substituting as starting material in Preparation 1, other compounds of Formula 2 in place of 17α-hydroxypregn-4-ene-3,20-dione, for example 16α-methyl-17α-hydroxypregn-4-ene-3,20-dione,
16β-methyl-17α-hydroxypregn-4-ene-3,20-dione,
11β,17α-dihydroxypregn-4-ene-3,20-dione,
9α-fluoro-11β,17α-dihydroxypregn-4-ene-3,20-dione,
16α-methyl-11β,17α-dihydroxypregn-4-ene-3,20-dione,
16β-methyl-11β,17α-dihydroxypregn-4-ene-3,20-dione,
9α-fluoro-16α-methyl-11β,17α-dihydroxypregn-4-ene-3,20-dione,
9α-fluoro-16β-methyl-11β,17α-dihydroxypregn-4-ene-3,20-dione,
pregn-4-ene-3,20-dione,
16α-methylpregn-4-ene-3,20-dione,
16β-methylpregn-4-ene-3,20-dione,
11β-hydroxypregn-4-ene-3,20-dione,
9α-fluoro-11β-hydroxypregn-4-ene-3,20-dione,
16α-methyl-11β-hydroxypregn-4-ene-3,20-dione,
16β-methyl-11β-hydroxypregn-4-ene-3,20-dione,
9α-fluoro-16α-methyl-11β-hydroxypregn-4-ene-3,20-dione,
9α-fluoro-16β-methyl-11β-hydroxypregn-4-ene-3,20-dione, and the corresponding 19-nor compounds such as:

17α-hydroxy-19-norpregn-4-ene-3,20-dione,
11β,17α-dihydroxy-19-norpregn-4-ene-3,20-dione,
19-norpregn-4-ene-3,20-dione,
11β-hydroxy-19-norpregn-4-ene-3,20-dione and the corresponding 9 and 16-substituted 19-norpregnenes, there are obtained the corresponding 5α,6α-epoxides of Formula I-A such as:

16α-methyl-5α,6α-epoxy-3,20-bis(ethylenedioxy)-pregnan-17α-ol,
16β-methyl-5α,6α-epoxy-3,20-bis(ethylenedioxy)-pregnan-17α-ol,
5α,6α-epoxy-3,20-bis(ethylenedioxy)-pregnane-11β,17α-diol,
9α-fluoro-5α,6α-epoxy-3,20-bis(ethylenedioxy)-pregnane-11β,17α-diol,
16α-methyl-5α,6α-epoxy-3,20-bis(ethylenedioxy)-pregnane-11β,17α-diol,
16β-methyl-5α,6α-epoxy-3,20-bis(ethylenedioxy)-pregnane-11β,17α-diol,
9α-fluoro-16α-methyl-5α,6α-epoxy-3,20-bis(ethylenedioxy)-pregnane-11β,17α-diol,
9α-fluoro-16β-methyl-5α,6α-epoxy-3,20-bis(ethylenedioxy)-pregnane-11β,17α-diol,
5α,6α-epoxy-3,20-bis(ethylenedioxy)-pregnane,
16α-methyl-5α,6α-epoxy-3,20-bis(ethylenedioxy)-pregnane,
16β-methyl-5α,6α-epoxy-3,20-bis(ethylenedioxy)-pregnane,
5α,6α-epoxy-3,20-bis(ethylenedioxy)-pregnan-11β-ol,
9α-fluoro-5α,6α-epoxy-3,20-bis(ethylenedioxy)-pregnan-11β-ol,
16α-methyl-5α,6α-epoxy-3,20-bis(ethylenedioxy)-pregnan-11β-ol,
16β-methyl-5α,6α-epoxy-3,20-bis(ethylenedioxy)-pregnan-11β-ol,
9α-fluoro-16α-methyl-5α,6α-epoxy-3,20-bis(ethylenedioxy)-pregnan-11β-ol,
9α-fluoro-16β-methyl-5α,6α-epoxy-3,20-bis(ethylenedioxy)-pregnan-11β-ol,
5α,6α-epoxy-3,20-bis(ethylenedioxy)-19-norpregnan-17α-ol,
5α,6α-epoxy-3,20-bis(ethylenedioxy)-19-norpregnane-11β,17α-diol,
5α,6α-epoxy-3,20-bis(ethylenedioxy)-19-norpregnane, 5α,6α-epoxy-3,20-bis(ethylenedioxy)-19-norpregnane-11β-ol, and the corresponding 9 and 16-substituted 19-norpregnanes, respectively.

In the same manner the 11-keto compounds of Formula I–A, for example, those corresponding to the 11β-hydroxy compounds listed above can likewise be prepared from the corresponding 11-keto starting materials of Formula 3.

Similarly, other alkanediols can be substituted in place of ethylene glycol to produce the other 3,20-bis(alkylenedioxy) starting materials of Formula I–A.

EXAMPLE 1

*17α,20-dihydroxy-6α-(2'-hydroxyethyl)-pregn-4-one-3-one (V–A)*

To a stirred solution of 500 ml. of tetrahydrofuran and 24.5 g. of ethoxyacetylene in a nitrogen atmosphere was added 100 ml. of 3 M methylmagnesium bromide in ether over a period of about 10 min. The mixture was stirred for 60 minutes and then a solution of 20.0 g. of 5α,6α-epoxy-3,20-bis(ethylenedioxy)-pregnan-17α-ol (I–A) in 500 ml. of hot benzene was added dropwise over a period of about 45 minutes. The mixture was refluxed gently with stirring for a period of about 20 hours, cooled to near 0° C. and a solution of 20 g. of ammonium chloride in 150 ml. of water was added. The mixture was shaken with 2 l. of ice and water containing 75 g. of ammonium chloride and 1.5 l. of methylene chloride, and then filtered. The organic layer was separated, washed with dilute ammonium chloride solution, dried, and concentrated in vacuo. The residue was chromatographed on Florisil synthetic magnesium silicate (hereinafter referred to as Florisil). The column was eluted with methylene chloride-Skellysolve B (1:4) containing increasing proportions of acetone and those fractions of eluate which, on the basis of infrared analysis, were found to contain the desired product were combined and evaporated to dryness to give a total of 17.95 g. of 6β-ethoxyethynyl-3,20 - bis(ethylenedioxy - pregnane-5α,17α-diol (II–A), M.P. 170–171° C. (dec.); an analytical sample recrystalized from acetone-Skellysolve B melted at 175–176° C. (dec.); the infrared spectrum confirmed the structure.

*Analysis.*—Calcd. for $C_{29}H_{44}O_7$ (percent): C, 69.02; H, 9.79. Found (percent): C, 68.98; H, 9.00.

A mixture of 5 g. of the 6β-ethoxyethynyl-3,20-bis(ethylenedioxy)-pregnane-5α,17β-diol, 100 ml. of tetrahydrofuran and 10 ml. of 10% sulfuric acid was stirred at room temperature for about 5 hours. The mixture was then diluted with cold water, extracted with methylene chloride, and the methylene chloride extract was washed with dilute sodium bicarbonate solution, water, dried and concentrated in vacuo. The residue thus obtained was chromatographed on Florisil. The column was eluted with Skellysolve B-methylene chloride (4:1) containing increasing portions of acetone, and those fractions of eluate which, on the basis of infrared absorption analysis, were found to contain the desired material were combined and evaporated to dryness. There was thus obtained 4.5 g. of 5α,17α-dihydroxypregnane-3,20-dione-6β-acetic acid ethyl ester (III–A), M.P. 209–215° C.; an analytical sample crystallized from ethyl acetate-Skellysolve B. melted at 216–217° C.

*Analysis.*—Calcd. for $C_{25}H_{38}O_6$ (percent): C, 69.09; H, 8.81. Found (percent): C, 68.94; H, 8.70.

To a stirred suspension of 5 g. of 5α,17α-dihydroxypregnane-3,20-dione-6β-acetic acid ethyl ester in 20 ml. of absolute methanol at 55° C. was added under a nitrogen atmosphere 2.5 ml. of pyrrolidine. The mixture was stirred at 55° C. for 5 minutes, cooled and filtered, yielding 4.2 g. of 17α-hydroxy-3-(N-pyrrolidyl)-pregn-3,5-diene-3,20-dione-6-acetic acid ethyl ester (3-pyrrolidyl enamine of 17α - hydrogypregn - 4 - ene-3,20-dione-6-acetic acid ethyl ester) (IV–A), M.P. 125–127° C. (dec.); infrared spectrum confirmed the structure.

A solution of 4.2 g. of the enamine in about 50 ml. of dry benzene was added with stirring to 2.0 g. of lithium aluminum hydride in 170 ml. of anhydrous ether under a nitrogen atmosphere. The mixture was refluxed for about 90 minutes and then a solution of 15 ml. of water in 30 ml. of tetrahydrofuran was added cautiously. The mixture was concentrated to a paste in vacuo. Methanol (120 ml.) and glacial acetic acid (25 ml.) were added to the residue and the resulting mixture was stirred at 50° C. for 15 minutes. The mixture was cooled in a nitrogen atmosphere, 30 g. of sodium hydroxide in 150 ml. of water was added, and the mixture was stirred at 30–35° C. for about 15 minutes. The mixture was neutralized with acetic acid and concentrated in vacuo to remove most of the methanol. The residue was cooled, made distinctly acidic with cold dilute hydrochloric acid, and extracted with chloroform. The chloroform extract was washed with dilute hydrochloric acid, dilute sodium bicarbonate solution, water, dried and concentrated in vacuo giving 17α,20-dihydroxy - 6α - (2'-hydroxyethyl)-pregn-4-ene-3-one (V–A).

In the same manner substituting as starting material in Example 1 other 5α,6α-epoxides of Formula I–A in place of 5α,6α - epoxy-3,20-bis(ethylenedioxy)pregn-17α-ol, for example, those named in the last paragraph of Preparation 1, there are ultimately obtained the corresponding 2'-hydroxyethyl compounds of Formula V, such as:

16α-methyl-17α,20-dihydroxy-6α-(2'-hydroxyethyl)-pregn-4-en-3-one,
16β-methyl-17α,20-dihydroxy-6α-(2'-hydroxyethyl)-pregn-4-en-3-one,
11β,17α,20-trihydroxy-6α-(2'-hydroxyethyl)-pregn-4-en-3-one,
9α-fluoro-11β,17α-20-trihydroxy-6α-(2'-hydroxyethyl)-pregn-4-en-3-one,
16α-methyl-11β,17α,20-trihydroxy-6α-(2'-hydroxyethyl)-pregn-4-en-3-one,
16β-methyl-11β,17α,20-trihydroxy-6α-(2'-hydroxyethyl)-pregn-4-en-3-one,
9α-fluoro-16α-methyl-11β,17α,20-trihydroxy-6α-(2'-hydroxyethyl)-pregn-4-en-3-one,
9α-fluoro-16β-methyl-11β,17α,20-trihydroxy-6α-(2'-hydroxyethyl)-pregn-4-en-3-one,
20-hydroxy-6α-(2'-hydroxyethyl)-pregn-4-en-3-one,
16α-methyl-20-hydroxy-6α-(2'-hydroxyethyl)-pregn-4-en-3-one,
16β-methyl-20-hydroxy-6α-(2'-hydroxyethyl)-pregn-4-en-3-one,
11β,20-dihydroxy-6α-(2'-hydroxyethyl)-pregn-4-en-3-one,
9α-fluoro-11β,20-dihydroxy-6α-(2'-hydroxyethyl)-pregn-4-en-3-one,
16α-methyl-11β,20-dihydroxy-6α-(2'-hydroxyethyl)-pregn-4-en-3-one,
16β-methyl-11β,20-dihydroxy-6α-(2'-hydroxyethyl)-pregn-4-en-3-one,
9α-fluoro-16α-methyl-11β,17α,20-dihydroxy-6α-(2'-hydroxyethyl)-pregn-4-en-3-one,
9α-fluoro-16β-methyl-11β,20-dihydroxy-6α-(2'-hydroxyethyl)-pregn-4-en-3-one,
17α,20-dihydroxy-6α-(2'-hydroxyethyl)-19-norpregn-4-en-3-one,
11β,17α,20-trihydroxy-6α-(2'-hydroxyethyl)-19-nonpregn-4-en-3-one,
20-hydroxy-6α-(2'-hydroxyethyl)-19-norpregn-4-en-3-one,
11β,20-dihydroxy-6α-(2'-hydroxyethyl)-19-norpregn-4-en-3-one, and the corresponding 9 and 16-substituted 19-norpregnenes.

When the corresponding 11-oxo compounds of Formula I–A are used as starting materials, the 11-oxo group is concomitantly reduced to 11β-hydroxy to give the corresponding 11β-hydroxy-6α-(2′-hydroxyethyl) compounds of Formula V–A.

EXAMPLE 2

*17α - hydroxyspiro[pregn-4-ene-6,1′-cyclopropane]-3,20-dione (X) and spiro[androst-4-ene-6,1′-cyclopropane]-3,17-dione*

The 17α,20-dihydroxy-6α-(2′-hydroxyethyl)-pregn-4-ene-3-one (V–A) from Example 1 was dissolved in 100 ml. of acetone containing 5 drops of 70% perchloric acid. After 10 minutes, 1 ml. of pyridine was added and the mixture was concentrated in vacuo. A methylene chloride solution of the residue was washed with dilute acid and base, water, dried, concentrated in vacuo and the residue was chromatographed on Florisil. The column was eluted with Skellysolve B-methylene chloride (20:1) containing increasing proportions of acetone and those fractions of eluate which, on the basis of infrared absorption analysis, were found to contain the desired material were combined and evaporated to dryness. There was thus obtained 2.8 g. of 17α,20-dihydroxy-6α-(2′-hydroxyethyl)-pregn-4-ene-3-one 17,20-acetonide (VI–A), the infrared spectrum of which is consistent with the structural assignment.

A mixture of 2.78 g. of the 17α,20-dihydroxy-6α-(2′-hydroxyethyl)-pregn-4-ene-3-one 17,20-acetonide, 25 ml. of methylene chloride, 3 ml. of pyridine, and 1.30 g. of p-toluene-sulfonyl chloride was allowed to stand at room temperature overnight. The mixture was diluted with methylene chloride and washed with water, dilute acid and base, water, dried and concentrated in vacuo to give 17α,20 - dihydroxy - 6α - (2′-tosyloxyethyl)-pregn-4-ene-3-one 17,20-acetonide. The infrared spectrum confirmed the structure.

A benzene solution (50 ml.) of the tosylate was concentrated in vacuo, additional benzene was added and then removed in vacuo to dry the sample. The residue was dissolved in about 50 ml. of anydrous t-butyl alcohol and 0.80 g. of potassium t-butoxide was added with stirring under a nitrogen atmosphere. The mixture was stirred and heated at 35–40° C. for a period of about 90 minutes, cooled and neutralized with acetic acid. The mixture was concentrated in vacuo and the residue dissolved in methylene chloride. The organic solution was washed with dilute acid and base, water, dried and concentrated in vacuo. The residue was dissolved in methylene chloride and chromatographed on a column of Florisil. The column was eluted with Skellysolve B-methylene chloride (10:1) containing increasing portions of acetone and those fractions of eluate which, on the basis of infrared absorption analysis, were found to contain the desired material were combined and evaporated to dryness. There was thus obtained 1.71 g. of 17α,20-dihydroxyspiro[pregn - 4 - ene - 6,1′ - cyclopropane] - 3 - one 17,20-acetonide. Recrystallization of this mtaerial from Skellysolve B containing a small amount of acetone gave 1.21 g. of 17α,20 - dihydroxyspiro[pregn - 4 - ene - 6,1′ - cyclopropane] - 3 - one 17,20 - acetonide (VIII–A), M.P. 173–174° C.

$\lambda_{max.}^{EtOH}$ 249 mμ, ε 14,600; the infrared and NMR spectra confirmed the structure.

*Analysis.*—Calcd. for $C_{26}H_{38}O_3$ (percent): C, 78.35; H, 9.61. Found (percent): C, 77.78; H, 9.84.

A mixture of 4.38 g. of 17α,20-dihydroxyspiro[pregn-4-ene-6,1′-cyclopropane]-3-one 17,20-acetonide, 50 ml. of tetrahydrofuran, 25 ml. of ethylene glycol, 20 ml. of water, and 10 ml. of concentrated hydrochloric acid was stirred at room temperature overnight. The mixture was neutralized with pyridine and concentrated in vacuo. The residue was extracted with chloroform and the extract was washed with dilute acid, thoroughly with water, dried and concentrated in vacuo. Chromatographic purification of the residue on Florisil and elution with 30% acetone-10% methylene chloride in Skellysolve B gave 17α,20-dihydroxyspiro[pregn - 4 - ene - 6,1′ - cyclopropane]-3-one (IX–A); the infrared spectrum was consistent with the structure.

To 2.55 g. of the 17α,20 - dihydroxyspiro[pregn - 4-en-6,1′-cyclopropane]-3-one in 20 ml. of glacial acetic acid and 2.2 ml. of water was added with stirring 2.25 ml. of a 50% solution of manganous nitrate followed by 4.5 ml. of a chromic acid solution (prepared rom 2.67 g. of chromium trioxide, 7.6 ml. of water and 2.3 ml. of concentrated sulfuric acid). The mixture was stirred for 5 minutes, diluted with ice and water, and extracted with methylene chloride. The extract was washed with dilute acid and base, water, dried, and concentrated in vacuo to give about 1.9 g. of product which was chromatographed on a column of Florisil. The column was eluted with Skellysolve B containing increasing portions of acetone and those fractions of eluate which appeared to be a single substance based on thin-layer chromatographic experiments were combined, evaporated to dryness and the residue was recrystallized from acetone-Skellysolve B giving 0.70 g. of spiro[androst - 4 - ene - 6,1′ - cyclopropane]-3,17-dione, M.P. 179–180° C.

$\lambda_{max.}^{EtOH}$ 249 mμ, ε 14,350, [α]_D+343° C. 0.85 (CHCl₃); the infrared and NMR spectra confirm the structure.

*Analysis.*—Calcd. for $C_{21}H_{28}O_2$ (percent): C, 80.73; H, 9.03. Found (percent): C, 80.72; H, 9.28.

The remaining fractions from the above chromatogram were combined and rechromatographed on Silica Gel which had been wet packed as a slurry in 25 ml. of methanol and 225 ml. of chloroform (containing 0.75% ethanol as a preservative). Elution with chloroform gave 0.55 g. of additional 17-ketosteroid described above and 0.44 g. of a band which on recrystallization from acetone-Skellysolve B gave 0.31 g. of 17α-hydroxyspiro[pregn-4-ene-6,1-cyclopropane]-3,20-dione (X), M.P. 224–226° C., $\lambda_{max.}^{EtOH}$ 249 mμ, ε 14,350, [α]_D+205° C. 0.65 (CHCl₃); the infrared and NMR spectra confirmed the structure.

*Analysis.*—Calcd. for $C_{23}H_{32}O_3$ (percent): C, 77.49; H, 9.05. Found (percent): C, 76.99; H, 9.17.

In the same manner substituting in the procedure of Example 2, other 6α-(2′-hydroxyethyl) compounds of Formula V–A, wherein, R₃ is hydroxy, in place of 17α,20-dihydroxy - 6α - (2′ - hydroxyethyl) - pregn - 4 - ene-3-one, there is ultimately produced the corresponding 6,1′-spirocyclopropanes of Formula X, wherein X is >CH₂ or >C=O and concomitantly therewith the corresponding androst-4-en-17-ones. When an 11β-hydroxy group is present, it is generally oxidized to an 11-oxo group, thus a proportionally larger amount of chromic acid solution is needed in the oxidation reaction. Using the 17α-hydroxy-6α-(2′-hydroxyethyl) compounds prepared and listed in Example 1 above as starting materials, for example:

16α-methyl-17α,20-dihydroxy-6α-(2′-hydroxyethyl)-pregn-4-en-3-one,
16β-methyl-17α,20-dihydroxy-6α-(2′-hydroxyethyl)-pregn-4-en-3-one,
11β,17α,20-trihydroxy-6α-(2′-hydroxyethyl)-pregn-4-en-3-one
9α-fluoro-11β,17α,20-trihydroxy-6α-(2′-hydroxyethyl)-pregn-4-en-3-one,
16α-methyl 11β,17α,20-trihydroxy-6α-(2′-hydroxyethyl)-pregn-4-en-3-one,
16β-methyl-11β,17α,20-trihydroxyl-6α-(2′-hydroxyethyl)-pregn-4-en-3-one,
9α-fluoro-16α-methyl-11β,17α,20-trihydroxy-6α-(2′-hydroxyethyl)-pregn-4-en-3-one,
9α-fluoro-16β-methyl-11β,17α,20-trihydroxy-6α-(2′-hydroxyethyl)-pregn-4-en-3-one, 17α,20-dihydroxy-6α-(2'-hydroxyethyl)-19-norpregn-
4-en-3-one,
16α-methyl-17α,20-dihydroxy-6α-(2'-hydroxyethyl)-
19-norpregn-4-en-3-one,
16β-methyl-17α,20-dihydroxy-6α-(2'-hydroxyethyl)-
19-norpregn-4-en-3-one,
11β,17α,20-trihydroxy-6α-(2'-hydroxyethyl)-19-
norpregn-4-en-3-one,
9α-fluoro-11β,17α,20-trihydroxy-6α-(2'-hydroxyethyl)-
19-norpregn-4-en-3-one,
16α-methyl-11β,17α,20-trihydroxy-6α-(2'-hydroxy-
ethyl)-19-norpregn-4-en-3-one,
16β-methyl-11β,17α,20-trihydroxy-6α-(2'-hydroxy-
ethyl)-19-norpregn-4-en-3-one,
9α-fluoro-16α-methyl-11β,17α,20-trihydroxy-6α-(2'-
hydroxyethyl)-19-norpregn-4-en-3-one, and
9α-fluoro-16β-methyl-11β,17α,20-trihydroxy-6α-(2'-
hydroxyethyl)-19-norpregn-4-en-3-one,
there are obtained:
16α-methyl-17α-hydroxyspiro[pregn-4-ene-6,1'-cyclo-
propane]-3,20-dione,
16β-methyl-17α-hydroxyspiro[pregn-4-ene-6,1'-cyclo-
propane]-3,20-dione,
17α-hydroxyspiro[pregn-4-ene-6,1'-cyclopropane]-
3,11,20-trione,
9α-fluoro-17α-hydroxyspiro[pregn-4-ene-6,1'-cyclo-
propane]-3,11,20-trione,
16α-methyl-17α-hydroxyspiro[pregn-4-one-6,1'-cyclo-
propane]-3,11,20-trione,
16β-methyl-17α-hydroxyspiro[pregn-4-ene-6,1'-cyclo-
propane]-3,11,20-trione,
9α-fluoro-16α-methyl-17α-hydroxyspiro[pregn-4-ene-
6,1'-cyclopropane]-3,11,20-trione,
9α-fluoro-16β-methyl-17α-hydroxyspiro[pregn-4-ene-
6,1'-cyclopropane]-3,11,20-trione,
17α-hydroxyspiro[19-norpregn-4-ene-6,1'-cyclo-
propane]-3,20-dione,
16α-methyl-17α-hydroxyspiro[19-norpregn-4-ene-
6,1'-cyclopropane]-3,20-dione,
16β-methyl-17α-hydroxyspiro[19-norpregn-4-ene-
6,1'-cyclopropane]-3,20-dione,
17α-hydroxyspiro[19-norpregn-4-ene-6,1'-cyclo-
propane]-3,11,20-trione,
9α-fluoro-17α-hydroxyspiro[19-norpregn-4-ene-6,1'-
cyclopropane]-3,11,20-trione,
16α-methyl-17α-hydroxyspiro[19-norpregn-4-ene-6,1'-
cyclopropane]-3,11,20-trione,
16β-methyl-17α-hydroxyspiro[19-norpregn-4-ene-6,1'-
cyclopropane]-3,11,20-trione,
9α-fluoro-16α-methyl-17α-hydroxyspiro[19-norpregn-
4-ene-6,1'-cyclopropane]-3,11,20-trione, and
9α - fluoro - 16β-methyl-17α-hydroxyspiro[19-norpregn-4-
ene-6,1'-cyclopropane]-3,11,20-trione,
repectively.

The corresponding androstenes are concomitantly produced in each of the above conversions giving:

16α-methylspiro[androst-4-ene-6,1'-cyclopropane]-
3,17-dione,
16β-methylspiro[androst-4-ene-6,1'-cyclopropane]-
3,17-dione,
spiro[androst-4-ene-6,1'-cyclopropane]-3,11,17-trione,
9α-fluorospiro[androst-4-ene-6,1'-cyclopropane]-
3,11,17-trione,
16α-methylspiro[androst-4-ene-6,1'-cyclopropane]-
3,11,17-trione,
16β-methylspiro[androst-4-ene-6,1'-cyclopropane]-
3,11,17-trione,
9α-fluoro-16α-methylspiro[androst-4-ene-6,1'-cyclo-
propane]-3,11,17-trione,
9α-fluoro-16β-methylspiro[androst-4-ene-6,1'-cyclo-
propane]-3,11,17-trione,
spiro[19 - norandrost-4-ene-6,1'-cyclopropane]-3,17-dione,
16α-methylspiro[19-norandrost-4-ene-6,1'-cyclo-
propane]-3,17-dione,
16β-methylspiro[19-norandrost-4-ene-6,1'-cyclo-
propane]-3,17-dione,
spiro[19-norandrost-4-ene-6,1'-cyclopropane]-3,11,17-
trione,
9α-fluorospiro[19-norandrost-4-ene-6,1'-cyclopropane]-
3,11,17-trione,
16α-methylspiro[19-norandrost-4-ene-6,1'-cyclopropane]-
3,11,17-trione,
16β-methylspiro[19-norandrost-4-ene-6,1'-cyclo-
propane]-3,11,17-trione,
9α-fluoro-16α-methylspiro[19-norandrost-4-ene-6,1'-
cyclopropane]-3,11,17-trione, and
9α-fluoro-16β-methylspiro[19-norandrost-4-ene-6,1'-
cyclopropane]-3,11,17-trione,
respectively.

The above-named androstenes are anabolic, hypocholesteremic, and androgenic agents. They can be administered in the same manner as hereinbefore described for the compounds of Formula I.

EXAMPLE 3

*Spiro[pregn-4-ene-6,1'-cyclopropane]-3,20-dione (X)*

A mixture of 2.0 g. of 20-hydroxy-6α-(2'-hydroxyethyl)-pregn-4-en-3-one (V–A), 50 ml. of methylene chloride, 3 ml. of dry pyridine, and 1.10 g. of p-toluenesulfonyl chloride is allowed to stand at room temperature for about 18 hours. The mixture is then diluted with methylene chloride and washed with water, dilute hydrochloric acid, dilute sodium bicarbonate solution, water and dried. A trace of pyridine is added and the methylene chloride solution is concentrated in vacuo to give a residue comprising 20 - hydroxy - 6α - (2'-toxyloxyethyl)-pregn-4-ene-3-one.

The crude tosylate residue thus obtained is dissolved in anhydrous t-butyl alcohol and 0.80 g. of potassium t-butoxide is added with stirring under a nitrogen atmosphere. The mixture is warmed to 30–40° C. until the ring closure is completed, cooled and neutralized with acetic acid. The mixture is concentrated in vacuo and the residue is dissolved in methylene chloride and the organic solution is washed with dilute hydrochloric acid, dilute sodium bicarbonate solution, water, dried and concentrated in vacuo. The residue thus obtained is chromatographed on Florisil. The column is eluted with Skellysolve B-methylene chloride containing increasing proportions of acetone and those fractions of eluate which on the basis of infrared absorption analysis are found to contain the desired product are combined and evaporated to dryness to give 20-hydroxyspiro[pregn-4-ene-6,1'-cyclopropane]-3-one (VII–A), which can be further purified by recrystallization from a suitable organic solvent, e.g., acetone-Skellysolve B.

To 1.25 g. of the 20-hydroxyspiro[pregn-4-ene-6,1'-cyclo-propane]-3-one thus obtained in 20 ml. of glacial acetic acid and 1.1 ml. of water is added with stirring 1.1 ml. of a 50% solution of manganeous nitrate followed by 2.25 ml. of a chromic acid solution (prepared from 2.67 g. of chromium trioxide, 7.6 ml. of water and 2.3 ml. of concentrated sulfuric acid). The mixture is stirred for a few minutes, diluted with ice and water, and extracted with methylene chloride. The extract is washed with dilute acid and base, water, dried, and concentrated in vacuo to give a residue containing spiro[pregn-4-ene-6,1'-cyclopropane]-3,20-dione which is chromatographed on a column of Florisil. The column is eluted with Skellysolve B containing increasing portions of acetone and those fractions of eluate which appear to be a single substance based on thin-layer chromatography are combined, evaporated to dryness and the residue is recrystallized from acetone-Skellysolve B to give spiro[pregn-4-ene-6,1'-cyclopropane]-3,20-dione (X).

In the same manner substituting as starting material in the procedure of Example 3 other 6α-(2'-hydroxyethyl)

compounds of Formula V–A, wherein $R_3$ is hydrogen in place of 20-hydroxy-6α-(2′-hydroxyethyl)-pregn-4-en-3-one is productive of the corresponding 6,1′-spirocyclopropanes; when a 11β-hydroxy group is present, it is concomitantly oxidized to 11-oxo; therefor a proportionally larger amount of chromic acid solution is required in the oxidation reaction. Using the 17α-hydrogen compounds prepared and listed in Example 1, above, for example:

16α-methyl-20-hydroxy-6α-(2′-hydroxyethyl)-pregn-4-en-3-one,
16β-methyl-20-hydroxy-6α-(2′-hydroxyethyl)-pregn-4-en-3-one,
11β,20-dihydoxy-6α-(2′-hydroxyethyl)-pregn-4-en-3-one,
9α-fluoro-11β,20-dihydroxy-6α-(2′-hydroxyethyl)-pregn-4-en-3-one,
16α-methyl-11β,20-dihydroxy-6α-(2′-hydroxyethyl)-pregn-4-en-3-one,
16β-methyl-11β,20-dihydroxy-6α-(2′-hydroxyethyl)-pregn-4-en-3-one,
9α-fluoro-16α-methyl-11β,20-dihydroxy-6α-(2′-hydroxyethyl)-pregn-4-en-3-one,
9α-fluoro-16β-methyl-11β,20-dihydroxy-6α-(2′-hydroxyethyl)-pregn-4-en-3-one,
20-hydroxy-6α-(2′-hydroxyethyl)-19-norpregn-4-en-3-one,
16α-methyl-20-hydroxy-6α-(2′-hydroxyethyl)-19-norpregn-4-en-3-one,
16β-methyl-20-hydroxy-6α-(2′-hydroxyethyl)-19-norpregn-4-en-3-one,
11β,20-dihydroxy-6α-(2′hydroxyethyl)-19-norpregn-4-en-3-one,
9α-fluoro-11β,20-dihydroxy-6α-(2′-hydroxyethyl)-19-norpregn-4-en-3-one,
16α-methyl-11β,20-dihydroxy-6α-(2′-hydroxyethyl)-19-norpregn-4-en-3-one,
16β-methyl-11β,20-dihydroxy-6α-(2′-hydroxyethyl)-19-norpregn-4-en-3-one,
9α-fluoro-16α-methyl-11β,20-dihydroxy-6α-(2′-hydroxyethly)-19-norpregn-4-en-3-one, and
9α-fluoro-16β-methyl-11β,20-dihydroxy-6α-(2′-hydroxyethyl)-19-norpregn-4-en-3-one,
there are obtained:
16α-methylspiro[pregn-4-ene-6,1′-cyclopropane]3,20-dione,
16β-methylspiro[pregn-4-ene-6,1′-cyclopropane]-3,20-dione,
spiro[pregn-4-ene-6,1′-cyclopropane]-3,11,20-trione,
9α-fluorospiro[pregn-4-ene-6,1′-cyclopropane]-3,11,20-trione,
16α-methylspiro[pregn-4-ene-6,1′-cyclopropane]-3,11,20-trione,
16β-methylspiro[pregn-4-ene-6,1′-cyclopropane]-3,11,20-trione,
9α-fluoro-16α-methylspiro[pregn-4-ene-6,1′-cyclopropane]-3,11,20-trione,
9α-fluoro-16β-methylspiro[pregn-4-ene-6,1′-cyclopropane]-3,11,20-trione,
spiro[19-norpregn-4-ene-6,1′-cyclopropane]-3,20-dione,
16α-methylspiro[19-norpregn-4-ene-6,1′-cyclopropane]-3,20-dione,
16β-methylspiro[19-norpregn-4-ene-6,1′-cyclopropane]-3,20-dione,
spiro[19-norpregn-4-ene-6,1′-cyclopropane]-3,11,20-trione,
9α-fluorospiro[19-norpregn-4-ene-6,1′-cyclopropane]-3,11,20-trione,
16α-methylspiro[19-norpregn-4-ene-6,1′-cyclopropane]-3,11,20-trione,
16β-methylspiro[19-norpregn-4-ene-6,1′-cyclopropane]-3,11,20-trione,
9α-fluoro-16α-methylspiro[19-norpregn-4-ene-6,1′-cyclopropane]3,11,20-trione, and
9α-fluoro-16β-methylspiro[19-norpregn-4-ene-6,1′-cyclopropane]-3,11,20-trione,
respectively.

EXAMPLE 4

*17α-hydroxy-6α-(2′-hydroxyethyl)-pregn-4-ene-3,20-dione (III–B)*

5α,6α - epoxy-3,20-bis(ethylenedioxy) - pregnan-17α-ol (I–B) is converted to 6β-ethoxyethynyl-3,20-bis(ethylenedioxy)-pregnane-5α,17α-diol (II–A) in accordance with the procedure of Example 1.

A mixture of 5 g. of the 6β-ethoxyethynyl-3,20-bis(ethylene-dioxy)-pregnane-5α,17α-diol thus obtained, 50 ml. of glacial acetic acid and 25 ml. of methylene chloride is then allowed to stand for about 18 hours at room temperature. The mixture is then poured into 500 ml. of ice and water containing 25 g. of sodium hydroxide and extracted with warm ethyl acetate. The extract is washed with dilute sodium bicarbonate, water, dried and concentrated in vacuo. The residue thus obtained is dissolved in 125 ml. of tetrahydrofuran and added cautiously to 4 g. of lithium aluminum hydride in 400 ml. of ether. The mixture is refluxed for about 2 hours and then 80 ml. of 2 N sodium hydroxide is added cautiously. The reaction mixture is then filtered and the solids are washed with warm ethyl acetate. The organic layer of the combined filtrate and wash is then separated, dried over anhydrous sodium sulfate, filtered and concentrated in vacuo to give a residue comprising 5α,17α - dihydroxy - 6β-(2′-hydroxyethyl)-pregnane-3,20-dione 3,20-bis(cyclic ethylene acetal) (I–B).

The residue thus obtained is dissolved in tetrahydrofuran and 6 ml. of 10% sulfuric acid is added with stirring. The mixture is stirred for about 6 hours and then about 75 ml. of 0.5 N sodium bicarbonate solution is added. Most of the tetrahydrofuran is removed in vacuo and the product is extracted with ethyl acetate. The extract is washed with water, dried and concentrated in vacuo to give a residue comprising 5α,17α-dihydroxy-6β-(2′-hydroxyethyl)-pregnane-3,20-dione (II–B).

The residue thus obtained is dissolved in 150 ml. of methanol containing 1 g. of sodium hydroxide and the mixture is refluxed for 2 to 5 minutes, then concentrated in vacuo. The residue is diluted with water and extracted with warm ethyl acetate. The extract is washed with water, dried and concentrated in vacuo. The residue thus obtained is crystallized from a suitable solvent or combination of solvents, e.g., aqueous acetone, giving 17α-hydroxy-6α-(2′-hydroxyethyl)-pregn-4-ene-3,20-dione (III–B).

In the same manner substituting in the procedure of Example 4, other 5α,6α-epoxides of Formula I–A as starting material in place of 5α,6α-epoxy-3,20-bis(methylenedioxy)-pregnan-17α-ol, for example those prepared and listed in Preparation 1, above, is productive of the following corresponding 2′-hydroxyethyl compounds of Formula III–B:

16α-methyl-17α-hydroxy-6α-(2′-hydroxyethyl)-pregn-4-ene-3,20-dione,
16β-methyl-17α-hydroxy-6α(2′-hydroxyethyl)-pregn-4-ene-3,20-dione,
11β,17α-dihydroxy-6α-(2′-hydroxyethyl)-pregn-4-ene-3,20-dione,
9α-fluoro-11β,17α-dihydroxy-6α-(2′-hydroxyethyl)-pregn-4-ene-3,20-dione,
16α-methyl-11β,17α-dihydroxy-6α-(2′-hydroxyethyl)-pregn-4-ene-3,20,dione,
16β-methyl-11β,17α-dihydroxy-6α-(2′-hydroxyethyl)-pregn-4-ene-3,20-dione,
9α-fluoro-16α-methyl-11β,17α-dihydroxy-6α-(2′-hydroxyethyl)-pregn-4-ene-3,20-dione,
9α-fluoro-16β-methyl-11β,17α-dihydroxy-6α-(2′-hydroxyethyl)-pregn-4-ene-3,20-dione,
6α-(2′-hydroxyethyl)-pregn-4-ene-3,20-dione,
16α-methyl-6α-(2′-hydroxyethyl)-pregn-4-ene-3,20-dione, 16β-methyl-6α-(2'-hydroxyethyl)-pregn-4-ene-3,20-dione,
11β-hydroxy-6α-(2'-hydroxyethyl)-pregn-4-ene-3,20-dione,
9α-fluoro-11β-hydroxy-6α-(2'-hydroxyethyl)-pregn-4-ene-3,20-dione,
16α-methyl-11β-hydroxy-6α-(2'-hydroxyethyl)-pregn-4-ene-3,20-dione,
16β-methyl-11β-hydroxy-6α-(2'-hydroxyethyl)-pregn-4-ene-3,20-dione,
9α-fluoro-16α-methyl-11β-hydroxy-6α-(2'-hydroxyethyl)-pregn-4-ene-3,20-dione,
9α-fluoro-16β-methyl-11β-hydroxy-6α-(2'-hydroxyethyl)-pregn-4-ene-3,20-dione,
17α-hydroxy-6α(2'-hydroxyethyl)-norpregn-4-ene-3,20-dione,
16α-methyl-17α-hydroxy-6α-(2'-hydroxyethyl)-norpregn-4-ene-3,20-dione,
16β-methyl-17α-hydroxy-6α(2'-hydroxyethyl)-norpregn-4-ene-3,20-dione,
11β,17α-dihydroxy-6α(2'-hydroxyethyl)-19-norpregn-4-ene-3,20-dione,
9α-fluoro-11β,17α-dihydroxy-6α-(2'-hydroxyethyl)-19-norpregn-4-ene-3,20-dione,
16α-methyl-11β,17α-dihydroxy-6α-(2'-hydroxyethyl)-19-norpregn-4-ene-3,20-dione,
16β-methyl-11β,17α-dihydroxy-6α-(2'-hydroxyethyl)-19-norpregn-4-ene-3,20-dione,
9α-fluoro-16α-methyl-11β,17α-dihydroxy-6α-(2'-hydroxyethyl)-19-norpregn-4-ene-3,20-dione,
9α-fluoro-16β-methyl-11β,17α-dihydroxy-6α-(2'-hydroxyethyl)-19-norpregn-4-ene-3,20-dione,
6α-(2'-hydroxyethyl)-19-norpregn-4-ene-3,20-dione,
16α-methyl-6α-(2'-hydroxyethyl)-19-norpregn-4-ene-3,20-dione,
16β-methyl-6α-(2'-hydroxyethyl)-19-norpregn-4-ene-3,20-dione,
11β-hydroxy-6α-(2'-hydroxyethyl)-19-norpregn-4-ene-3,20-dione,
9α-fluoro-11β-hydroxy-6α-(2'-hydroxyethyl)-19-norpregn-4-ene-3,20-dione,
16α-methyl-11β-hydroxy-6α-(2'-hydroxyethyl)-19-norpregn-4-ene-3,20-dione,
16β-methyl-11β-hydroxy-6α-(2'-hydroxyethyl)-19-norpregn-4-ene-3,20-dione,
9α-fluoro-16α-methyl-11β-hydroxy-6α-(2'-hydroxyethyl)-19-norpregn-4-ene-3,20-dione, and
9α-fluoro-16β-methyl-11β-hydroxy-6α-(2'-hydroxyethyl)-19-norpregn-4-ene-3,20-dione,
respectively.

When the corresponding 11-oxo compounds of Formula I-A are used as starting materials the 11-oxo group is concomitantly reduced to 11β-hydroxy to give the corresponding 11β-hydroxy-6α(2'-hydroxyethyl) compounds of Formula III-B.

EXAMPLE 5

*17α-hydroxyspiro[pregn-4-ene-6,1'-cyclopropane]-3,20-dione (X)*

A mixture of 2.0 g. of 17α-hydroxy-6α-(2'-hydroxyethyl)-pregn-4-ene-3,20-dione, 50 ml. of methylene chloride, 3 ml. of dry pyridine, and 1.10 g. of p-toluenesulfonyl chloride is allowed to stand at room temperature for about 18 hours. The mixture is then diluted with methylene chloride and washed with water, dilute hydrochloric acid, dilute sodium bicarbonate solution, water and dried. A trace of pyridine is added and the methylene chloride solution is concentrated in vacuo to give a residue comprising 17α - hydroxy-6α-(2'-toxyloxyethyl)-pregn-4-ene-3,20-dione.

The crude tosylate residue thus obtained is dissolved in anhydrous t-butyl alcohol and 0.80 g. of potassium t-butoxide is added with stirring under a nitrogen atmosphere. The mixture is warmed to 30–40° C. until the ring closure is complete, cooled and neutralized with acetic acid. The mixture is concentrated in vacuo and the residue is dissolved in methylene chloride and the organic solution is washed with dilute hydrochloric acid, dilute sodium bicarbonate solution, water, dried, and concentrated in vacuo. The residue thus obtained is chromatographed on Florisil. The column is eluted with Skellysolve B-methylene chloride containing increasing proportions of acetone and those fractions of eluate which, on the basis of infrared absorption analysis, are found to contain the desired product are combined and evaporated to dryness to give 17α-hydroxyspiro[pregn-4-ene-6,1'-cyclopropane]-3,20-dione (X) which can be further purified by recrystallization from a suitable organic solvent, e.g., acetone.

In the same manner substituting other 6α-(2'-hydroxyethyl) compounds of Formula III-B, as starting material in Example 5, in place of 17α-hydroxy-6α-(2'-hydroxyethyl)-pregn-4-ene-3,20-dione, is productive of the corresponding 6,1'-spirocyclopropanes of Formula X, wherein X is >CH$_2$ or

for example, those named and listed in the last paragraph of Example 4, is productive of:

16α-methyl-17α-hydroxyspiro[pregn-4-ene-6,1'-cyclopropane]-3,20-dione,
16b-methyl-17α-hydroxyspiro[pregn-4-ene-6,1'-cyclopropane]-3,20-dione,
11β,17α-dihydroxyspiro[pregn-4-ene-6,1'-cyclopropane]-3,20-dione,
9α-fluoro-11β,17α-dihydroxyspiro[pregn-4-ene-6,1'-cyclopropane]-3,20-dione,
16α-methyl-11β,17α-dihydroxyspiro[pregn-4-ene-6,1'-cyclopropane]-3,20-dione,
16β-methyl-11β,17α-dihydroxyspiro[pregn-4-ene-6,1'-cyclopropane]-3,20-dione,
9α-fluoro-16α-methyl-11β,17α-dihydroxyspiro[pregn-4-ene-6,1'-cyclopropane]-3,20-dione,
9α-fluoro-16β-methyl-11β,17α-dihydroxyspiro[pregn-4-ene-6,1'-cyclopropane]-3,20-dione,
spiro[pregn-4-ene-6,1'-cyclopropane]-3,20-dione,
16α-methylspiro[pregn-4-ene-6,1'-cyclopropane]-3,20-dione,
16β-methylspiro[pregn-4-ene-6,1'-cyclopropane]-3,20-dione,
11β-hydroxyspiro[pregn-4-ene-6,1'-cyclopropane]-3,20-dione,
9α-fluoro-11β-hydroxyspiro[pregn-4-ene-6,1'-cyclopropane]-3,20-dione,
16α-methyl-11β-hydroxyspiro[pregn-4-ene-6,1'-cyclopropane]-3,20-dione,
16β-methyl-11β-hydroxyspiro[pregn-4-ene-6,1'-cyclopropane]-3,20-dione,
9α-fluoro-16α-methyl-11β-hydroxyspiro[pregn-4-ene-6,1'-cyclopropane]-3,20-dione,
9α-fluoro-16β-methyl-11β-hydroxyspiro[pregn-4-ene-6,1'-cyclopropane]-3,20-dione,
17α-hydroxyspiro[19-norpregn-4-ene-6,1'-cyclopropane]-3,20-dione,
16α-methyl-17α-hydroxyspiro[19-norpregn-4-ene-6,1'-cyclopropane]-3,20-dione,
16β-methyl-17α-hydroxyspiro[19-norpregn-4-ene-6,1'-cyclopropane]-3,20-dione,
11β,17α-dihydroxyspiro[19-norpregn-4-ene-6,1'-cyclopropane]-3,20-dione,
9α-fluoro-11β,17α-dihydroxyspiro[19-norpregn-4-ene-6,1'-cyclopropane]-3,20-dione,
16α-methyl-11β,17α-dihydroxyspiro[19-norpregn-4-ene-6,1'-cyclopropane]-3,20-dione, 16β-methyl-11β,17α-dihydroxyspiro[19-norpregn-4-ene-6,1'-cyclopropane]-3,20-dione,
9α-fluoro-16α-methyl-11β,17α-dihydroxyspiro[19-norpregn-4-ene-6,1'-cyclopropane]-3,20-dione,
9α-fluoro-16β-methyl-11β,17α-dihydroxyspiro[19-norpregn-4-ene-6,1'-cyclopropane]-3,20-dione,
spiro[19-norpregn-4-ene-6,1'-cyclopropane]-3,20-dione,
16α-methylspiro[19-norpregn-4-ene-6,1'-cyclopropane]-3,20-dione,
16β-methylspiro[19-norpregn-4-ene-6,1'-cyclopropane]-3,20-dione,
11β-hydroxyspiro[19-norpregn-4-ene-6,1'-cyclopropane]-3,20-dione,
9α-fluoro-11β-hydroxyspiro[19-norpregn-4-ene-6,1'-cyclopropane]-3,20-dione,
16α-methyl-11β-hydroxyspiro[19-norpregn-4-ene-6,1'-cyclopropane]-3,20-dione,
16β-methyl-11β-hydroxyspiro[19-norpregn-4-ene-6,1'-cyclopropane]-3,20-dione,
9α-fluoro-16α-methyl-11β-hydroxyspiro[19-norpregn-4-ene-6,1'-cyclopropane]-3,20-dione, and
9α-fluoro-16β-methyl-11β-hydroxyspiro[19-norpregn-4-ene-6,1'-cyclopropane]-3,20-dione, respectively.

EXAMPLE 6

*17α-acetoxyspiro[pregn-4-ene-6,1'-cyclopropane]-3,20-dione (X)*

A mixture of 100 mg. of 17α-hydroxyspiro[pregn-4-ene-6,1'-cyclopropane]-3,20-dione, 100 mg. of calcium carbonate powder and 3 ml. of acetic anhydride was heated with stirring at 140° for a period of about 7 hours and then allowed to stand overnight. The mixture was diluted with water to hydrolyze the excess acetic anhydride. The product was extracted with methylene chloride and the extract was washed with dilute sodium bicarbonate solution, water, dried and concentrated yielding 17α-acetoxyspiro[pregn - 4 - ene-6,1' - cyclopropane]-3,20-dione; its thin-layer chromatography behavior and infrared spectrum were fully consistent with the assigned structure.

In the same manner substituting in place of acetic anhydride other acid anhydrides or acid halides of organic carboxylic acids, among which are the hydrocarbon carboxylic acids of from 1 to 16 carbon atoms, inclusive, previously listed, is productive of the corresponding 17α-acyloxyspiro[pregn-4-ene-6,1'-cyclopropane]-3,20-dione.

In the same manner following the procedure of Example 6, other compounds of Formula X, wherein $R_3$ is hydroxy, for example the 17α-hydroxy compounds prepared and listed in Examples 2, 3 and 5 are converted to the corresponding 17α-acylates of Formula XI, by reacting the selected free 17α-hydroxy compound with the appropriate acid anhydride or acid halide.

EXAMPLE 7

*17α-hydroxyspiro[pregna-1,4-diene-6,1'-cyclopropane]-3,20-dione (XII)*

A medium is prepared of 20 g. of cornsteep liquor (60% solids), 10 g. of commercial dextrose and 1 l. of tap water adjusted to a pH of between 4.8 and 5.0. One ml. of lard oil is added as a foam preventative. Ten l. of this sterilized medium is inoculated with a 72-hour vegetative growth of *Septomyxa affinis*, ATCC 6737, and incubated at a temperature of about 28° C. with aeration at the rate of 0.5 l. per minute and stirring at 300 r.p.m. After 24 to 48 hours, or when a moderate to heavy growth of mycelium is apparent, 1.0 g. of 17α-hydroxyspiro[pregn-4-ene-6,1'-cyclopropane]-3,20-dione plus 50 mg. of 3-ketobisnor-4-cholen-22-al dissolved in dimethylformamide is added and the incubation carried out at the same temeprature (about 28° C.) and aeration until the conversion is essentially complete (final pH about 8.3). The mycelium is then filtered off and extracted with three 200-ml. portions of acetone. The beer is extracted with three 1-liter portions of methylene chloride and thereupon the acetone extracts and the extracts of the beer are combined, dried over anhydrous sodium sulfate and evaporated and the resulting residue chromatographed over a Florisil column, which on elution with Skellysolve B hexanes containing increasing proportions of acetone from 1 to 50% and crystallization gives 17α-hydroxyspiro[pregna - 1,4 - diene-6,1'-cyclopropane]-3,20-dione (XII).

In the same manner substituting other compounds of Formula X, wherein $R_1$ is methyl, for example, the 19-methyl compounds prepared and listed in Examples 2, 3 and 5, above, is productive of the following corresponding $\Delta^{1,4}$ compound of Formula XII:

16α-methyl-17α-hydroxyspiro[pregna-1,4-diene-6,1'-cyclopropane]-3,20-dione,
16β-methyl-17α-hydroxyspiro[pregna-1,4-diene-6,1'-cyclopropane]-3,20-dione,
11β,17α-dihydroxyspiro[pregna-1,4-diene-6,1'-cyclopropane]-3,20-dione,
9α-fluoro-11β,17α-dihydroxyspiro[pregna-1,4-diene-6,1'-cyclopropane]-3,20-dione,
16α-methyl-11β,17α-dihydroxy[pregna-1,4-diene-6,1'-cyclopropane]-3,20-dione,
16β-methyl-11β,17α-dihydroxy[pregna-1,4-diene-6,1'-cyclopropane]-3,20-dione,
9α-fluoro-16α-methyl-11β,17α-dihydroxy[pregna-1,4-diene-6,1'-cyclopropane]-3,20-dione,
9α-fluoro-16β-methyl-11β,17α-dihydroxy[pregna-1,4-diene-6,1'-cyclopropane]-3,20-dione,
spiro[pregna-1,4-diene-6,1'-cyclopropane]-3,20-dione,
16α-methylspiro[pregna-1,4-diene-6,1'-cyclopropane]-3,20-dione,
16β-methylspiro[pregna-1,4-diene-6,1'-cyclopropane]-3,20-dione,
11β-hydroxyspiro[pregna-1,4-diene-6,1'-cyclopropane]-3,20-dione,
9α-fluoro-11β-hydroxyspiro[pregna-1,4-diene-6,1'-cyclopropane]-3,20-dione,
16α-methyl-11β-hydroxyspiro[pregna-1,4-diene-6,1'-cyclopropane]-3,20-dione,
16β-methyl-11β-hydroxyspiro[pregna-1,4-diene-6,1'-cyclopropane]-3,20-dione,
9α-fluoro-16α-methyl-11β-hydroxyspiro[pregna-1,4-diene-6,1'-cyclopropane]-3,20-dione,
9α-fluoro-16β-methyl-11β-hydroxyspiro[pregna-1,4-diene-6,1'-cyclopropane]-3,20-dione,
17α-hydroxyspiro[pregna-1,4-diene-6,1'-cyclopropane]-3,11,20-trione,
9α-fluoro-17α-hydroxyspiro[pregna-1,4-diene-6,1'-cyclopropane]-3,11,20-trione,
16α-methyl-17α-hydroxyspiro[pregna-1,4 -diene-6,1'-cyclopropane]-3,11,20-trione,
16β-methyl-17α-hydroxyspiro[pregna-1,4-diene-6,1'-cyclopropane]-3,11,20-trione,
9α-fluoro-16α-methyl-17α-hydroxyspiro[pregna-1,4-diene-6,1'-cyclopropane]-3,11,20-trione,
9α-fluoro-16β-methyl-17α-hydroxyspiro[pregna-1,4-diene-6,1'-cyclopropane]-3,11,20-trione,
spiro[pregna-1,4-diene-6,1'-cyclopropane]-3,11,20-trione,
9α-fluorospiro[pregna-1,4-diene-6,1'-cyclopropane]-3,11,20-trione,
16α-methylspiro[pregna-1,4-diene-6,1'-cyclopropane]-3,11,20-trione,
16β-methylspiro[pregna-1,4-diene-6,1'-cyclopropane]-3,11,20-trione,
9α-fluoro-16α-methylspiro[pregna-1,4-diene-6,1'-cyclopropane]-3,11,20-trione, and
9α-fluoro-16β-methylspiro[pregna-1,4-diene-6,1'-cyclopropane]-3,11,20-trione, respectively.

Instead of Septomyxa, species of other genera such as Corynebacterium, Didymella, Calonectria, Alternaria, Colletotrichum, Cylindrocarpon, Ophiobolus, Fusarium, Listeria, Mycobacterium, Tricothecium, Leptosphaeria, Cucurbitaria, Nocardia, and enzymes of fungi of the family Tuberculariaceae can be used to introduce a Δ¹-bond into the compounds of Formula X to obtain the corresponding Δ¹,⁴ compounds of Formula XII.

EXAMPLE 8

*17α-acetoxyspiro[pregna-1,4-diene-6,1'-cyclopropane]-3,20-dione (XII)*

A mixture of 100 mg. of 17α-acetoxyspiro[pregn-4-ene-6,1'-cyclopropane]-3,20-dione in about 6 ml. of tertiary butyl alcohol and 0.55 ml. of acetic acid is heated together with 30 mg. of selenium dioxide to approximately 75° C. under stirring for a period of about 24 hours. Thereafter another 30 mg. portion of selenium dioxide is added and the mixture heated to 75° C. under continuous stirring for an additional period of 24 hours. The mixture is then cooled, filtered to remove the selenium dioxide and evaporated. The residue is chromatographed on Florisil and recrystallized from acetone-Skellysolve B to give 17α-acetoxyspiro[pregn-1,4 - diene - 6,1' - cyclopropane]-3,20-dione.

In the same manner substituting in Example 8 other compounds of Formula XI, or the compounds of Formula X, wherein R is hydrogen, as starting material in place of 17α-acetoxyspiro[pregn - 4 - ene - 6,1' - cyclopropane]-3,20-dione, is productive of the corresponding compounds of Formula XII, wherein R is hydrogen or OAcyl, respectively.

EXAMPLE 9

*17α-acetoxyspiro[pregna-1,4-diene-6,1'-cyclopropane]-3,20-dione (XII)*

A mixture of 100 mg. of 17α-hydroxyspiro[pregna-1,4-diene-6-1'-cyclopropane]-3,20-dione, 100 mg. of calcium carbonate powder and 3 ml. of acetic anhydride is stirred and heated at 140° for a period of about 8 hours and then allowed to stand overnight. The mixture is diluted with water to hydrolyze the excess acetic anhydride. The product is extracted with methylene chloride and the extract washed with dilute sodium bicarbonate solution, water, dried and concentrated yielding 17α-acetoxyspiro[pregna-1,4-diene-6,1'-cyclopropane]-3,20-dione.

In the same manner substituting in place of acetic anhydride other acid anhydrides or acid halides or organic carboxylic acids, amoung which are the hydrocarbon carboxylic acids of from 1 to 16 carbon atoms, inclusive, previously listed, is productive of the corresponding 17α-acyloxyspiro[pregna-1,4-diene - 6,1' - cyclopropane]-3,20-dione.

In the same manner following the procedure of Example 9, other compounds of Formula XII, wherein R is hydroxy, for example the 17α-hydroxy compounds prepared and listed in Example 7 are converted to the corresponding 17α-acylates of Formula XII by reacting the selected free 17α-hydroxy compound with the appropriate acid anhydride or acid halide.

I claim:

1. A compound of the formula:

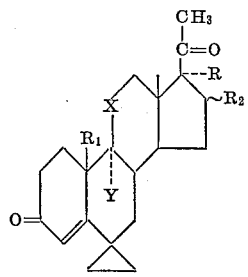

wherein R is selected from the group consisting of hydrogen, hydroxy and OAcyl in which Acyl is the acyl radical of a hydrocarbon carboxylic acid of 1 to 16 carbon atoms, inclusive; $R_1$ is selected from the group consisting of hydrogen and methyl; $R_2$ is selected from the group consisting of hydrogen, and methyl; X is selected from the group consisting of >C=O, and

and Y is flourine.

2. A compound of the formula:

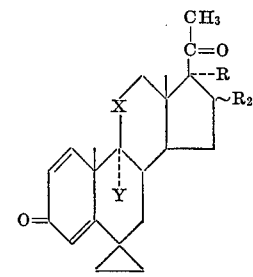

wherein R is selected from the group consisting of hydrogen, hydroxy and OAcyl in which Acyl is the acyl radical of a hydrocarbon carboxylic acid of 1 to 16 carbon atoms, inclusive, $R_2$ is selected from the group consisting of hydrogen, and methyl; X is selected from the group consisting of >C=O,

and Y is flourine.

3. A compound of the formula:

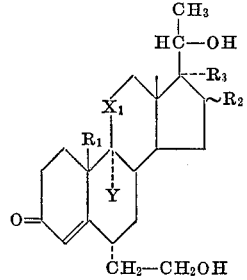

wherein $R_1$ is selected from the group consisting of hydrogen and methyl; $R_2$ is selected from the group consisting of hydrogen and methyl; $R_3$ is selected from the group consisting of hydrogen and hydroxy; $X_1$ is selected from the group consisting of >CH₂ and

Y is selected from the group consisting of hydrogen and fluorine; and wherein when Y is >CH₂, Y is limited to hydrogen.

4. 17α,20-dihydroxy-6α-(2' - hydroxyethyl) - pregn-4-ene-3-one.

5. A compound of the formula:

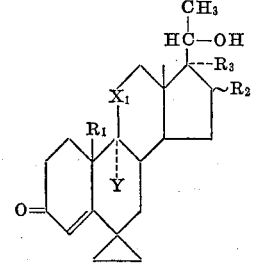

wherein $R_1$ is selected from the group consisting of hydrogen and methyl; $R_2$ is selected from the group consisting of hydrogen and methyl; $R_3$ is selected from the group consisting of hydrogen and hydroxy; $X_1$ is selected from the group consisting of

and Y is fluorine.

6. A compound of the formula:

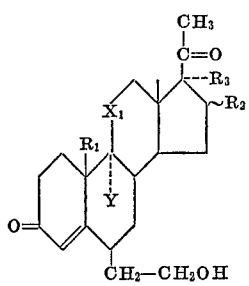

wherein $R_1$ is selected from the group consisting of hydrogen and methyl; $R_2$ is selected from the group consisting of hydrogen and methyl; $R_3$ is selected from the group consisting of hydrogen and hydroxy; $X_1$ is selected from the group consisting of $>CH_2$, and

Y is selected from the group consisting of hydrogen and fluorine; and wherein when $X_1$ is $>CH_2$, Y is limited to hydrogen.

7. A compound of the formula:

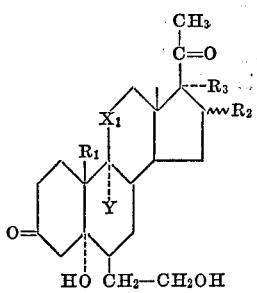

wherein $R_1$ is selected from the group consisting of hydrogen and methyl; $R_2$ is selected from the group consisting of hydrogen and methyl; $R_3$ is selected from the group consisting of hydrogen and hydroxy; $X_1$ is selected from the group consisting of $>CH_2$ and

Y is selected from the group consisting of hydrogen and fluorine; and wherein when $X_1$ is $>CH_2$, Y is limited to hydrogen.

8. The process which comprises reacting a 6α-(2'-hydroxyethyl)-pregn-4-en-3-one with a sulfonic acid halide and subjecting the 6α-(2'-sulfonyloxyethyl)-pregn-4-en-3-one so obtained to treatment under basic conditions to produce the corresponding spiro-[pregn-4-ene-6,1'-cyclopropane]-3-one.

9. The process which comprises reacting a 6α-(2'-hydroxyethyl) compound of the formula:

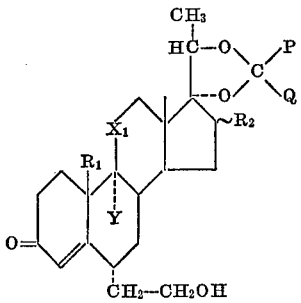

wherein P and Q are selected from the group consisting of hydrogen, and an alkyl radical of 1 to 8 carbon atoms, inclusive, an aralkyl radical of 7 to 13 carbon atoms, inclusive, and an aryl radical of 6 to 12 carbon atoms, inclusive; and wherein P and Q when taken together with the attached carbon atom represent a cycloalkyl radical of 3 to 8 carbon atoms, inclusive, $R_1$ is selected from the group consisting of hydrogen and methyl; $R_2$ is selected from the group consisting of hydrogen and methyl; $X_1$ is selected from the group consisting of $>CH_2$ and

Y is selected from the group consisting of hydrogen and fluorine; and wherein when $X_1$ is $>CH_2$, Y is limited to hydrogen; with an organic sufonic acid halide, subjecting the 6α5(2'-organic sulfonyloxyethyl) derivative so obtained, to treatment under basic conditions to obtain the corresponding 6,1'-spirocyclo-propyl-17α,21 - acetonide, and hydrolyzing the latter compound with an aqueous acid to obtain the corresponding 17α,21-free hydroxy compound of the formula:

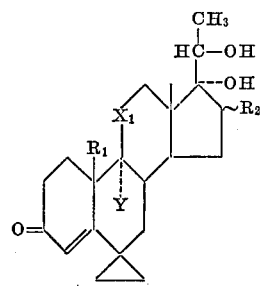

wherein $R_1$, $R_2$, $X_1$ and Y have the meanings and limitations given above.

10. The process which comprises reacting a 6α-(2'-hydroxyethyl) compound of the formula:

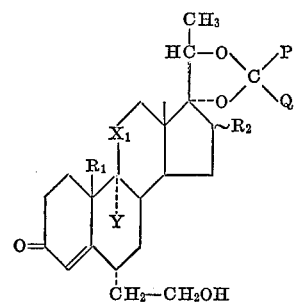

wherein P and Q are selected from the group consisting of hydrogen, an alkyl radical of 1 to 8 carbon atoms, inclusive, an aralkyl radical of 7 to 13 carbon atoms, inclusive, and an aryl radical of 6 to 12 carbon atoms, inclusive, and wherein P and Q when taken together with the attached carbon atom represent a cycloalkyl radical of 3 to 8 carbon atoms, inclusive; $R_1$ is selected from the group consisting of hydrogen and methyl; $R_2$ is selected from the group consisting of hydrogen and methyl; $X_1$ is selected from the group consisting of $>CH_2$ and

Y is selected from the group consisting of hydrogen and fluorine; and wherein when $X_1$ is $>CH_2$, Y is limited to hydrogen; with an organic sulfonic acid halide, subjecting the 6α-(2′-organic sulfonyloxyethyl) derivative so obtained, to treatment under basic conditions to obtain the corresponding 6,1′ - spirocyclopropyl - 17α,21 - acetonide, hydrolyzing 6,1′-spirocyclopropyl-17α,21-acetonide thus obtained with an aqueous acid to obtain the corresponding 17α,20-free alcohol and oxidizing the latter compound with an oxidizing agent to obtain a compound of the formula:

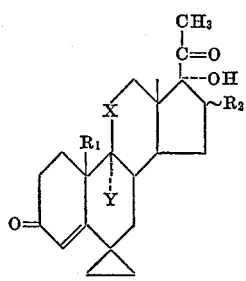

wherein $R_1$, $R_2$ and Y have the meanings and limitations given above and X is selected from the group consisting of $>CH_2$, $>C=O$ and

11. The process which comprises reacting 17α,20-dihydroxy-6α-(2′-hydroxyethyl)-pregn-4-ene - 3-one 17,20-acetonide with p-toluenesulfonyl chloride in the presence of pyridine, treating the 17α-20-dihydroxy-6α-(2′-tosyloxyethyl)-pregn-4-ene-3-one 17,20-acetonide so obtained with potassium tert.-butoxide to obtain 17α,20-dihydroxyspiro[pregn-4-ene-6,1′-cyclopropane] - 3 - one 17,20-acetonide and hydrolyzing the latter compound with hydrochloric acid to obtain 17α,20-dihydroxyspiro[pregn-4-ene-6,1′-cyclopropane]-3-one.

12. The process which comprises reacting 17α,20-dihydroxy-6α-(2′-hydroxyethyl)-pregn-4-ene-3-one 17,20-acetonide with p-toluenesulfonyl chloride in the presence of pyridine, treating the 17α,20-dihydroxy-6α-(2′-tosyloxyethyl)-pregn-4-ene-3-one 17,20-acetonide so obtained with potassium tert.-butoxide, hydrolyzing the 17α,20-dihydroxyspiro[pregn-4-ene-6,1′-cyclopropane]-3 - one 17,20-acetonide so obtained with hydrochloric acid to obtain 17α,20-dihydroxyspiro[pregn-4-ene-6,1′-cyclo - propane]-3-one and oxidizing the latter compound with chromic acid to obtain 17α-hydroxyspiro[pregn-4-ene-6,1′-cyclopropane]-3,20-dione.

13. The process which comprises reacting a 6α-(2′-hydroxyethyl) compound of the formula:

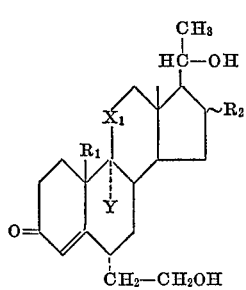

wherein $R_1$ is selected from the group consisting of hydrogen and methyl; $R_2$ is selected from the group consisting of hydrogen and methyl; $X_1$ is selected from the group consisting of $>CH_2$ and

Y is selected from the group consisting of hydrogen and fluorine; and wherein when $X_1$ is $>CH_2$, Y is limited to hydrogen; with an organic sulfonic acid halide, to obtain the corresponding 6α-(2′-organic sulfonyloxyethyl) derivative thereof and subjecting the latter compound to treatment under basic conditions to obtain a compound of the formula:

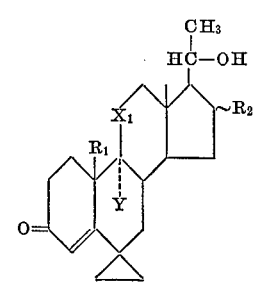

wherein $R_1$, $R_2$, $X_1$ and Y have the meanings and limitation given above.

14. The process which comprises reacting a 6α-(2′-hydroxyethyl) compound of the formula:

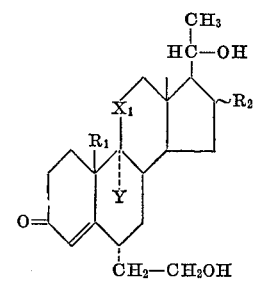

wherein $R_1$ is selected from the group consisting of hydrogen and methyl; $R_2$ is selected from the group consisting of hydrogen and methyl; $X_1$ is selected from the group consisting of $>CH_2$ and

and Y is selected from the group consisting of hydrogen and fluorine; and wherein when $X_1$ is $>CH_2$, Y is limited to hydrogen; with an organic sulfonic acid halide, subjecting the 6α-(2′-organic sulfonyloxyethyl) derivative so obtained, to treatment under basic conditions to obtain the corresponding 6,1′-spirocyclopropyl compound and oxidizing the latter compound with an oxidizing agent to obtain a compound of the formula:

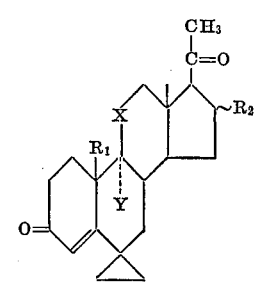

wherein $R_1$, $R_2$ and Y have the meanings and limitation given above, and X is selected from the group consisting of >CH$_2$, >C=O and

15. The process which comprises reacting a 6α-(2'-hydroxyethyl) compound of the formula:

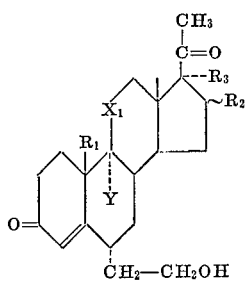

wherein R$_1$ is selected from the group consisting of hydrogen and methyl; R$_2$ is selected from the group consisting of hydrogen and methyl; R$_3$ is selected from the group consisting of hydrogen and hydroxy; X$_1$ is selected from the group consisting of >CH$_2$ and

Y is selected from the group consisting of hydrogen and fluorine; and wherein when X$_1$ is >CH$_2$, Y is limited to hydrogen; with an organic sulfonic acid halide to obtain the corresponding 6α-(2'-organic sulfonyloxyethyl) derivative thereof and subjecting the latter compound to treatment under basic conditions to obtain a compound of the formula:

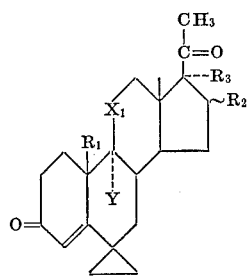

wherein R$_1$, R$_2$, R$_3$, X$_1$ and Y have the meanings given above.

16. The process which comprises reacting a 6α-(2'-hydroxyethyl) compound of the formula:

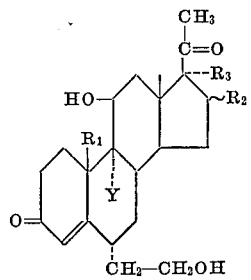

wherein R$_1$ is selected from the group consisting of hydrogen and methyl; R$_2$ is selected from the group consisting of hydrogen and methyl; R$_3$ is selected from the group consisting of hydrogen and hyroxy; and Y is selected from the group consisting of hydrogen and fluorine; with an organic sulfonic acid halide to obtain the corresponding 6α-(2'-organic sulfonyloxyethyl) derivative thereof, subjecting the latter compound to treatment under basic conditions to obtain a compound of the formula:

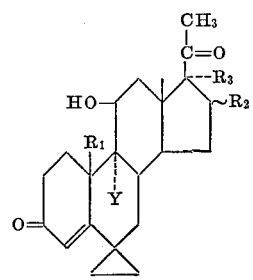

wherein R$_1$, R$_2$ and Y have the meanings given above, and oxidizing the 11β-hydroxy compound thus obtained with an oxidizing agent to obtain the corresponding 11-oxo compound.

17. A compound of the formula

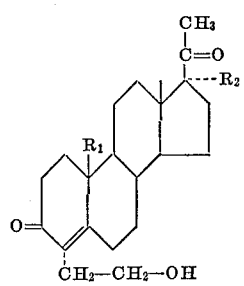

wherein R$_1$ is selected from the group consisting of hydrogen and methyl and R$_2$ is selected from the group consisting of hydrogen, hydroxy and acetoxy.

No references cited.

HENRY A. FRENCH, Primary Examiner

U.S. Cl. X.R.

195—51; 260—239.5, 239.55, 397.3, 397.45, 999